(12) United States Patent
Hyatt et al.

(10) Patent No.: US 11,983,857 B2
(45) Date of Patent: May 14, 2024

(54) SYSTEM AND METHOD FOR VISUAL PRODUCTION LINE INSPECTION OF DIFFERENT PRODUCTION ITEMS

(71) Applicant: INSPEKTO A.M.V. LTD., Ramat Gan (IL)

(72) Inventors: Yonatan Hyatt, Tel-Aviv (IL); Harel Boren, Givat Shmuel (IL); Zohar Kantor, Habonim (IL); Dan Carmon, Modiin (IL)

(73) Assignee: INSPEKTO A.M.V. LTD., Ramat Gan (IL)

( * ) Notice: Subject to any disclaimer, the term of this patent is extended or adjusted under 35 U.S.C. 154(b) by 777 days.

(21) Appl. No.: 17/087,653

(22) Filed: Nov. 3, 2020

(65) Prior Publication Data

US 2021/0056681 A1    Feb. 25, 2021

Related U.S. Application Data

(63) Continuation-in-part of application No. PCT/IL2019/050483, filed on Apr. 30, 2019.

(60) Provisional application No. 62/666,118, filed on May 3, 2018.

(51) Int. Cl.
*G06T 7/00* (2017.01)
*G01N 21/88* (2006.01)

(52) U.S. Cl.
CPC ....... *G06T 7/0004* (2013.01); *G01N 21/8851* (2013.01); *G01N 2021/8887* (2013.01); *G06T 2207/10152* (2013.01); *G06T 2207/30108* (2013.01)

(58) Field of Classification Search
CPC .... G05B 19/41875; G05B 2219/37208; G05B 2219/50064; G06T 7/0004; G06T 2207/30108; G06T 2207/10152; G01N 21/8851; G01N 2021/8887
See application file for complete search history.

(56) References Cited

U.S. PATENT DOCUMENTS 5,978,521 A * 11/1999 Wallack ............... G01B 11/275
                                                              382/294
6,025,910 A *  2/2000 Lucas .................... B07C 5/3408
                                                              356/240.1
(Continued)

FOREIGN PATENT DOCUMENTS

KR        101688458 B1     12/2016

OTHER PUBLICATIONS

Natsagdorj, et al., "Vision-based assembly and inspection system for golf club heads", Robotics and Integrated Manufacturing, Apr. 2015, vol. 32, pp. 83-92, Available Online Nov. 7, 2014, Elsevier Ltd., Amsterdam, Netherlands.

(Continued)

*Primary Examiner* — Sang H Nguyen
(74) *Attorney, Agent, or Firm* — AlphaPatent Associates Ltd.; Daniel J. Swirsky

(57) ABSTRACT

An appliance and method for automated visual inspection of at least two items from different categories, on a production line, include automatically switching between an item profile of a first of the at least two items for inspection; and an item profile of a second of the at least two items for inspection, based on detection of the first item in an image of the production line.

18 Claims, 21 Drawing Sheets

(56) References Cited

U.S. PATENT DOCUMENTS

| | | | |
|---|---|---|---|
| 6,067,155 A * | 5/2000 | Ringlien | G01N 21/21 356/240.1 |
| 6,661,931 B1 | 12/2003 | Kawada | |
| 8,103,085 B1 * | 1/2012 | Zadeh | G06T 7/001 382/141 |
| 9,070,192 B1 * | 6/2015 | Smith | G06T 7/90 |
| 9,224,070 B1 | 12/2015 | Sundareswara et al. | |
| 2002/0180960 A1 | 12/2002 | Koren et al. | |
| 2003/0182251 A1 | 9/2003 | Kim et al. | |
| 2004/0030436 A1 | 2/2004 | Popp et al. | |
| 2010/0215246 A1 | 8/2010 | Albeck et al. | |
| 2011/0050889 A1 * | 3/2011 | Kiuchi | G06T 1/20 348/135 |
| 2011/0157577 A1 * | 6/2011 | Dohse | G03F 9/00 355/72 |
| 2012/0128230 A1 | 5/2012 | Meada | |
| 2012/0154607 A1 * | 6/2012 | Moed | G06K 7/10792 348/207.1 |
| 2012/0155741 A1 | 6/2012 | Shibuya | |
| 2014/0078498 A1 * | 3/2014 | Ikushima | G06T 7/001 356/237.1 |
| 2014/0304637 A1 * | 10/2014 | Ijiri | G06T 1/20 715/771 |
| 2015/0064813 A1 | 3/2015 | Ayotte | |
| 2015/0131116 A1 | 5/2015 | Sochi | |
| 2015/0362908 A1 | 12/2015 | Lee | |
| 2017/0103508 A1 | 4/2017 | Chang et al. | |
| 2018/0106593 A1 * | 4/2018 | Arden | H04N 13/243 |

OTHER PUBLICATIONS

Je-Kang Park, et al., "Machine Learning-Based Imaging System for Surface Defect Inspection", International Journal of Precision Engineering and Manufacturing—Green Technology, Jul. 2016, vol. 3, No. 3, pp. 303-310.

* cited by examiner

SYSTEM AND METHOD FOR VISUAL PRODUCTION LINE INSPECTION OF DIFFERENT PRODUCTION ITEMS

FIELD

The present disclosure relates to visual inspection of items on a production line and more specifically to an appliance and method for visual inspection of multiple products and product stages.

BACKGROUND

Inspection during production processes helps control the quality of products by identifying defects and then acting upon this detection, for example, by fixing the defect or discarding the defective part. The process of defect detection is important for quality assurance (QA) gating and sorting on production lines, and is consequently useful in improving productivity, improving production processes and working procedures, reducing defect rates, and reducing re-work and waste.

Automated visual inspection methods are used in production lines to identify visually detectable anomalies that may have a functional or aesthetic impact on a manufactured part. Due to the underlying technologies that drive them, current visual inspection solutions for production lines are typically highly customized to the particular QA, gating, or sorting task that is addressed, are very expensive, very time consuming to set up, and require expert selection and integration of hardware, cameras, lighting and software components, as well as expert maintenance of these throughout the lifetime of the inspection solution and the production line.

Manufacturing plants are consequently only able to deploy a limited number of such systems and must supplement these with an expensive internal/external human workforce to perform quality assurance (QA), gating, sorting or other tasks. Alternatively, the plant can skip inspection of products and/or inspection of production stages and run the risk of decreased quality resulting in potential loss of reputation and even financial claims against the plant for inferior products.

Due to the dedicated nature of current visual inspection solutions they are extremely inflexible, with each system limited to inspection of a specific stage of a specific product in an exact position using the specific lighting customized for that product and product stage. Adapting such a visual inspection system to inspect a new product or different product stage can take months between project initiation until deployment. This inflexibility is at odds with the workflow of modern production plants that utilize the same production lines for production of multiple products or product stages, often switching between products and/or stages several times daily, weekly or monthly, and in some cases handling thousands of products (and product stages within each product), on a single machine that takes part in the manufacturing process.

This inflexibility also means that current inspection systems are not able to provide a correlated determination of whether an entire product comprising multiple product stages is defect-free, since—if at all—each product stage is treated as a completely separate item for inspection by its own dedicated inspection system.

There is thus a growing inconsistency between industrial plants' need for agility on one hand, and the cumbersome and expensive set up process of contemporary inspection solutions, on the other hand.

SUMMARY

The present disclosure overcomes the drawbacks of the prior art by providing an automated visual inspection system for a production line that can easily and quickly transition between inspection of multiple products and/or product stages using a single controller running a defect detection algorithm for detecting visible defects on a manufactured item. Thus, multiple items from different categories can be inspected without tailored integration and rigid positioning or lighting requirements.

Embodiments of the invention also enable to inspect multiple product stages and provide a correlation between these to determine a product's defect status based on its component parts.

In one embodiment, an appliance and method for automated visual inspection of different category items on a production line, includes creating, for a first category item, an item profile which includes data relating to a relationship between the first category item and a second category item. A sequence of inspection of the first category item, relative to the second category item, is determined, based on the item profile of the first category item. Upon detection of the first category item in an image, a defect detection algorithm is applied in accordance with the determined sequence of inspection, and indications of defects for the first and second category items, can be output to a user, based on the defect detection algorithm.

In some embodiments, based on detection of the first category item in an image, there is an automatic switch between the item profile of the first category item and item profile of the second category item. Automatic switching between item profiles may be further based on one or a combination of pre programmed conditions, for example, completion of inspection of a predetermined number of another item, determination that an item is defect-free, etc.

In one embodiment, the sequence of inspection may include an order of inspection of different interest areas on a single item.

As used herein the term item may refer to an item on a production line which may be of any type, shape, size, material, or any other attribute and no example herein should be considered limiting.

The term category as used herein refers to manifestations of items in images of the production line. For example, different stages in a manufacture of a single product may be different categories; different views of the same item may be different categories; images of a same view of a same item obtained with different camera and/or lighting parameters, may be different categories; different types of items on the same production line may be different categories, etc. Similarly, items in the same stage of manufacture of a product, the same view of a same-type item and same-type items may all be in the same category.

As used herein, the term defect may include, for example, a visible flaw on the surface of an item, an undesirable size, shape or color of the item or of parts of the item, an undesirable number of parts of the item, a wrong or missing assembly of its interfaces, a broken or burned part, an incorrect alignment of an item or parts of an item, and in general, any difference between a defect free sample and the inspected item. Optionally or additionally a defect is a difference which would be evident to a human user between a defect free item (and/or group of defect free items) and a same-type inspected item. In some embodiments a defect may include flaws which are visible only in enlarged or high-resolution images, e.g., images obtained by microscopes or other specialized cameras.

The processes described below refer, for simplicity, to "images", however it should be appreciated that the processes described herein may be carried out on image data other than or in addition to full images. The term "images" also includes video captured by the cameras of the presently described system.

The term "product stage" as used herein should be understood to include any of an assembly stage (different stages of assembling items into a product), manufacturing stage (items are subjected to a form of processing as part of product manufacture), and/or inspection stage (each stage may be different view or section of the same product). As used herein product stages are related to one another by their being production stages or aspects of a product. The term item may be used to refer to a product stage. As used herein a "product" may refer to a completed commercial product but may also refer to a manufactured item or part that is destined for integration into a product.

Inspection of items as described herein should also be understood as inspection for purposes of defect detection, gating and/or sorting. Where one of these terms is used e.g.: "defect detection" this should be understood as referring to any one of defect detection, gating, or sorting.

Unless otherwise defined, all technical and scientific terms used herein have the same meaning as commonly understood by one of ordinary skill in the art to which this disclosure belongs. The materials, methods, and examples provided herein are illustrative only and not intended to be limiting.

Implementation of the method and system of the present disclosure may be by use of hardware or software on any operating system of any firmware or a combination thereof. For example, as hardware, selected steps of the disclosure could be implemented as a chip or a circuit. As software, selected steps of the disclosure could be implemented as a plurality of software instructions being executed by a computer using any suitable operating system. In any case, selected steps of the method and system of the disclosure could be described as being performed by a data processor, such as a computing platform for executing a plurality of instructions.

Unless specifically stated otherwise, as apparent from the following discussions, it is appreciated that throughout the specification discussions utilizing terms such as "analyzing", "processing," "computing," "calculating," "determining," "detecting", "identifying" or the like, refer to the action and/or processes of a computer, or similar electronic computing device as defined below, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

As used herein the terms "machine learning" or "artificial intelligence" refer to use of algorithms on a computing device that parse data, learn from this data, and then make a determination, where the determination is not deterministically replicable (such as with deterministically oriented software as known in the art).

Although the present disclosure is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The disclosure will now be described in relation to certain examples and embodiments with reference to the following illustrative drawing figures so that it may be more fully understood. In the drawings:

FIGS. 1A, 1B, 1E-1L, and 1O are illustrative schematic drawings, showing automated visual inspection of multiple product stages on a production line according to embodiments of the present disclosure;

DETAILED DESCRIPTION

Figure 1A:
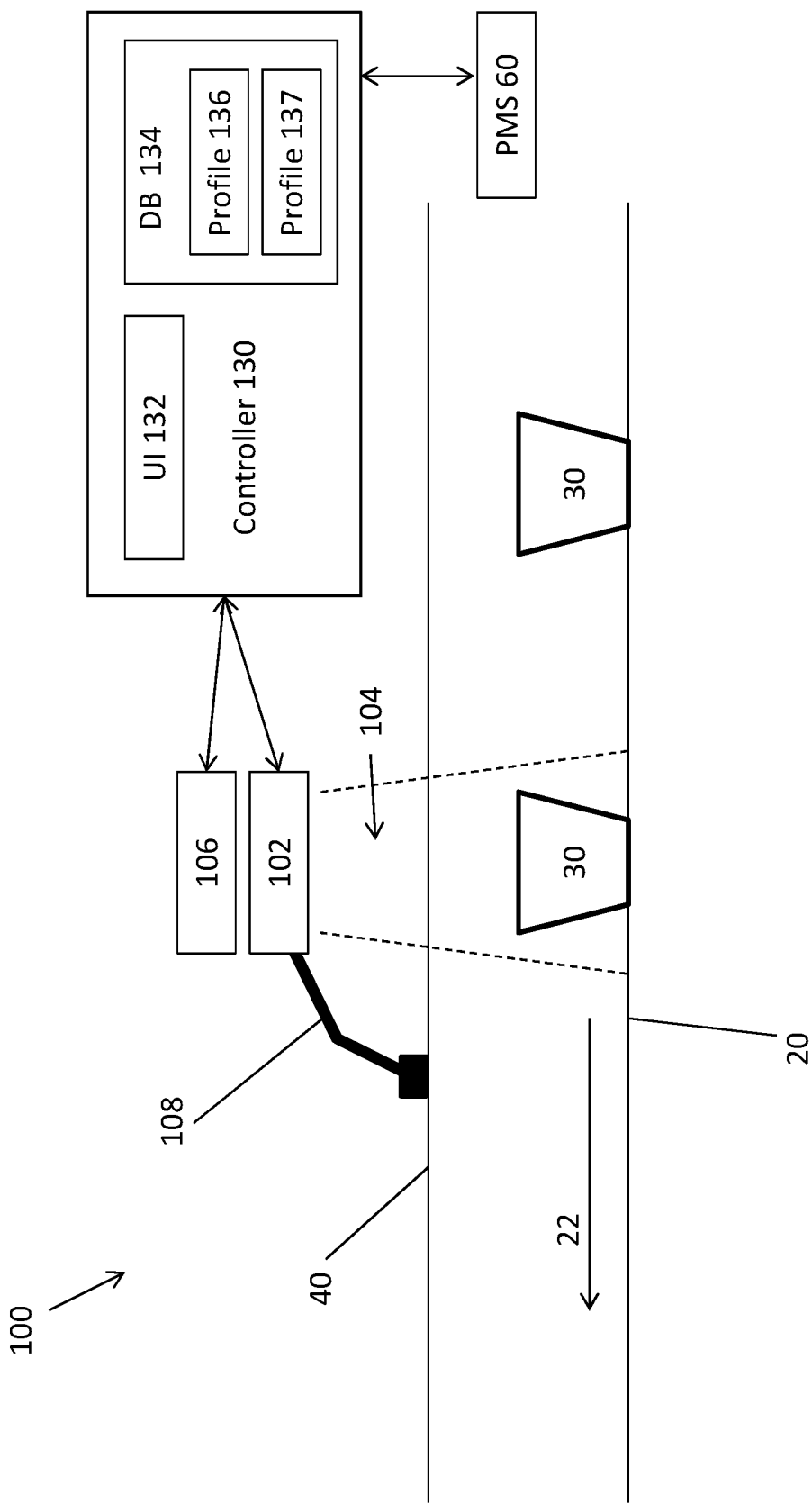

The present disclosure in at least some embodiments is a system and method for an automated visual inspection that can easily and quickly transition between inspection of multiple products and/or product stages, set in varying environmental and/or lighting conditions, for detecting visible defects on a manufactured item.

In embodiments of the invention a defect detection algorithm is employed to detect defects on imaged items. As further detailed below, the defect detection algorithm uses computer vision techniques to detect an item in an image (e.g., by detecting the boundaries of the item), typically based on previously obtained images of defect-free items from the same category. The detected item is then compared to a previously imaged defect-free item from the same category and defects on the item are detected based on the comparison.

In one embodiment (further detailed in the figures, below) a method for automated visual inspection of different category items on a production line, includes using a controller to create an item profile which includes data from images of same-category defect-free items on the production line. The controller applies a defect detection algorithm on an image of a same-category item on the production line to determine, based on the item profile, if the same-category item has a defect. The defect detection algorithm may be adjusted based on the item profile, (e.g., parameters of a neural network used by the algorithm may be adjusted based on data in the item profile, input values to the neural network may be adjusted based on data in the item profile, etc.) which enables using a single defect detection algorithm (or a single controller/appliance) to detect defects in a plurality of different category items. Thus, the controller can output to a user (e.g., a production line operator), indications of defects for a plurality of different category items.

In some embodiments, the images of the same-category defect-free items on the production line are received from a camera and the parameters of the camera are adjusted based on the item profile. An image of a same-category item is then received from the camera using the adjusted parameters and defect detection is carried out on the image.

In some embodiments, parameters of a light source used when capturing the images of the same-category defect-free items on the production line, are adjusted based on the item profile, and an image of a same-category item is obtained using the adjusted lighting parameters.

In some embodiments, defect detection is carried out using a defect detection algorithm and/or camera parameters and/or light source parameters all of which are adjusted based on the item profile.

The data from images of same-category defect-free items on the production line, may include, for example, one or more of: images that were approved as showing a defect-free item during the setup stage; item boundaries; specific inspection areas; optimal camera parameters for imaging the defect-free item; compositional properties of the defect-free item; indication of parts the defect-free item that move independently of other parts; typical image data values for the defect-free item for different camera parameters; typical image data values for the item for different light source parameters; optimal lighting parameters; and properties for optimal detection of alignment of the item.

In some embodiments the item profile includes instructions and information for the user. For example, an item profile may include at least one of: order of inspection of interest areas, an action to be taken based on detection of the item in the image and/or an action to be taken upon detection of a defect within an interest area. In another example, in a case where the different category items are different stages in a manufacture process of a single product, an item profile may include data relating to a relationship between the different category items. For example, the data relating to a relationship between the different category items may include of one or more of: a product stage identifier; an expected sequence of inspection of a first category item relative to a second category item; an item group; and a product group. In some embodiments, an item profile includes instructions that enable an inspection process to proceed, even in case of unexpected issues such as, if an item is not detected in an image. For example, a repeated sequence of inspection may be defined such that a first category item is inspected prior to a second category item and then again, a first category item is inspected and so on. In case one of the items is not detected in an image, the item profile (of the first and/or the second category item) may include instructions to proceed with inspection even if an item was not detected in a previous image.

In some embodiments an item profile for the same-category item is selected prior to applying the defect detection algorithm. The selecting may be based on one or a combination of: selection by a user; selection by an external system; selection following completion of a predetermined number of another stage as identified in a product group field of the item profile; selection based on item detection by the controller; selection based on item detection by the user; selection by an autonomous manufacturing machine; selection based on sequential connected items; selection based on connected group items; and selection based on repeat connected items.

In another embodiment a method for automated visual inspection of items on a production line, includes using a controller to create a first item profile including image data from images of a defect-free item from a first category, on the production line, and create a second item profile including image data from images of a defect-free item from a second category, on the production line. The controller may receive an image of an item for inspection and may detect a defect on the item for inspection, from the received image, and based on either the first item profile or the second item profile.

The first and second item profiles may include instructions and information for a user, e.g., as described herein. For example, the instructions and information for the user may include data relating to a relationship between the first category and second category.

Some embodiments of the invention provide an appliance for automated visual inspection of at least two items from different categories. In one embodiment the appliance includes a controller capable of creating a first item profile based on images of a first item and a second item profile based on images of the second item and capable of outputting an indication of a defect on a third item from either the first or second category, based on an image of the third item and based on either the first or second item profile. The appliance may also include at least one camera, in communication with the controller, to obtain the images of the first item and the second item.

The controller may control an intensity and/or color of a light source as well as parameters of the camera.

The first and/or second item profile may include optimal lighting parameters of the light source and/or optimal parameters of the camera.

In one embodiment the appliance is adapted to be attached to an adjustable mount and the first and/or second item profile may include positioning data or other instructions relating to the mount.

In one embodiment the first and/or second item profiles include data relating to a relationship between the first and second categories. This and other embodiments of the invention enable the controller to determine a product's defect status based on defects detected on items comprising the product and to output an indication of the product's defect status. Thus, the controller may determine a defect status that includes a combined status of the first item and second item. For example, a defect status may include statistics relating to an item (e.g., level of confidence of defect determination, percent of defects on item, etc.) and a combined status may include, e.g., statistics for a product made up of the first and second items. The defect status may be displayed to a user.

Figure 1B:
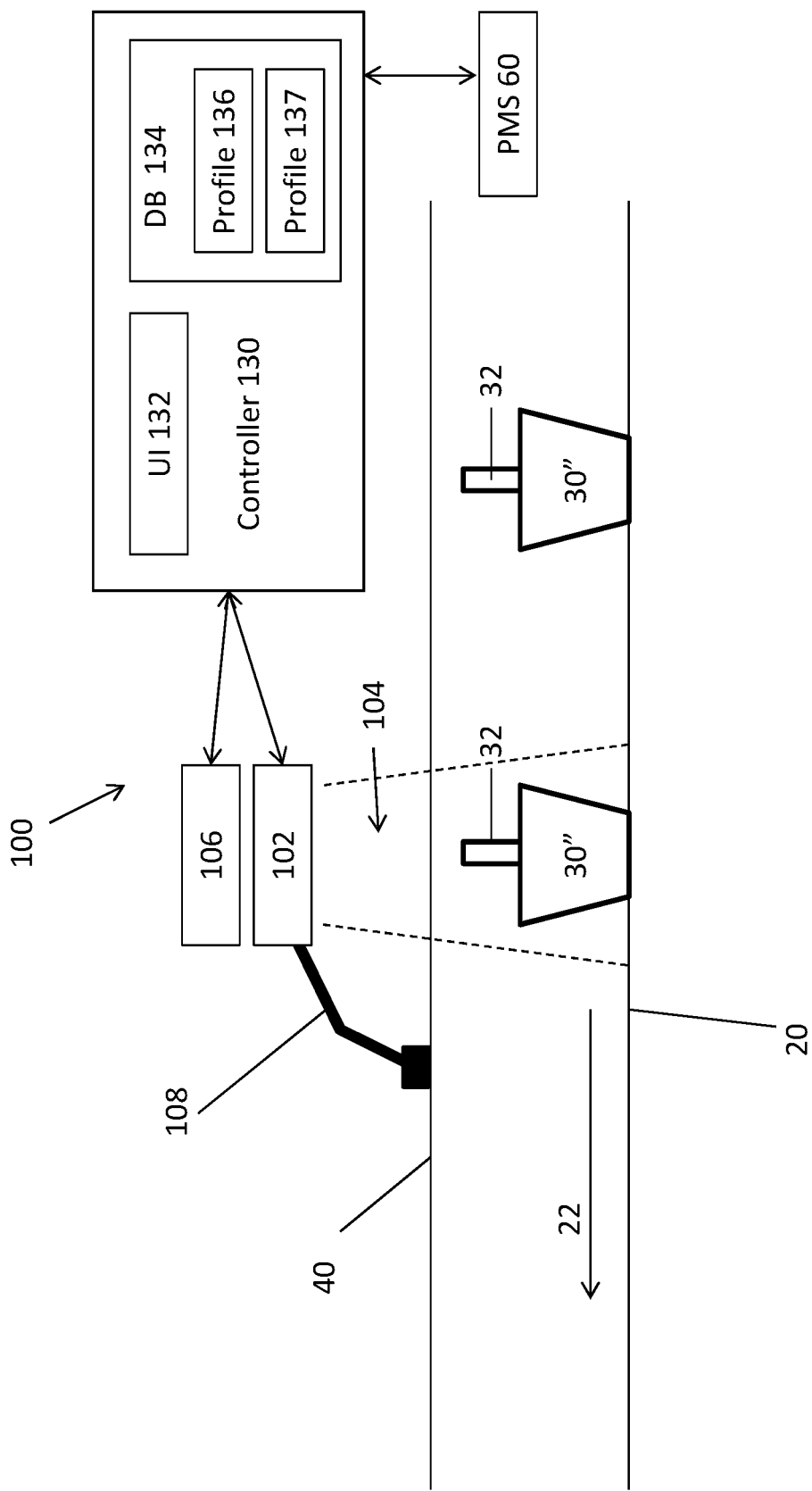
Figure 1C:
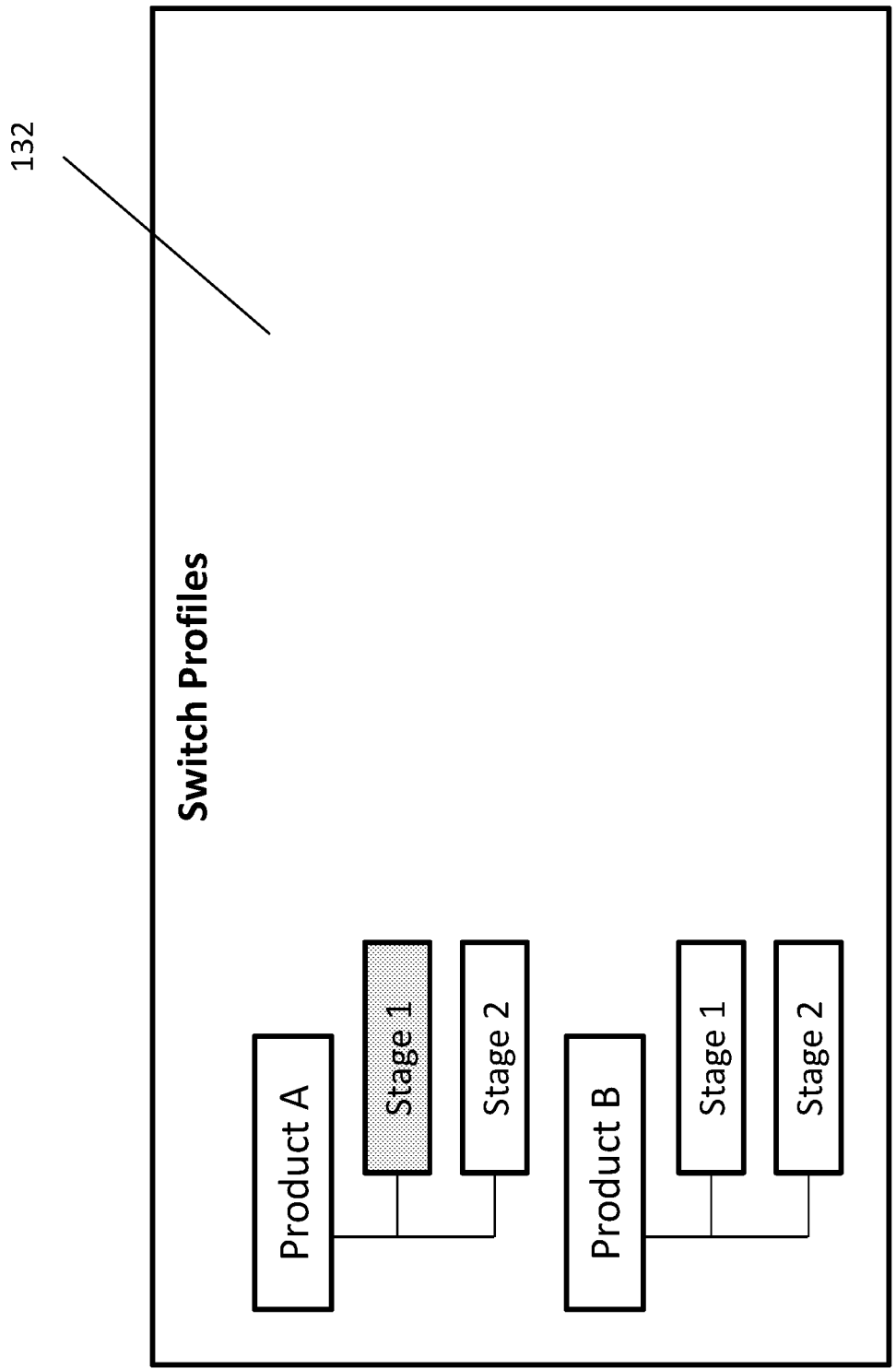
FIGS. 1C, 1M and 1N are illustrative screenshots showing automated visual inspection of multiple product stages on a production line according to embodiments of the present disclosure.
Figure 1D:
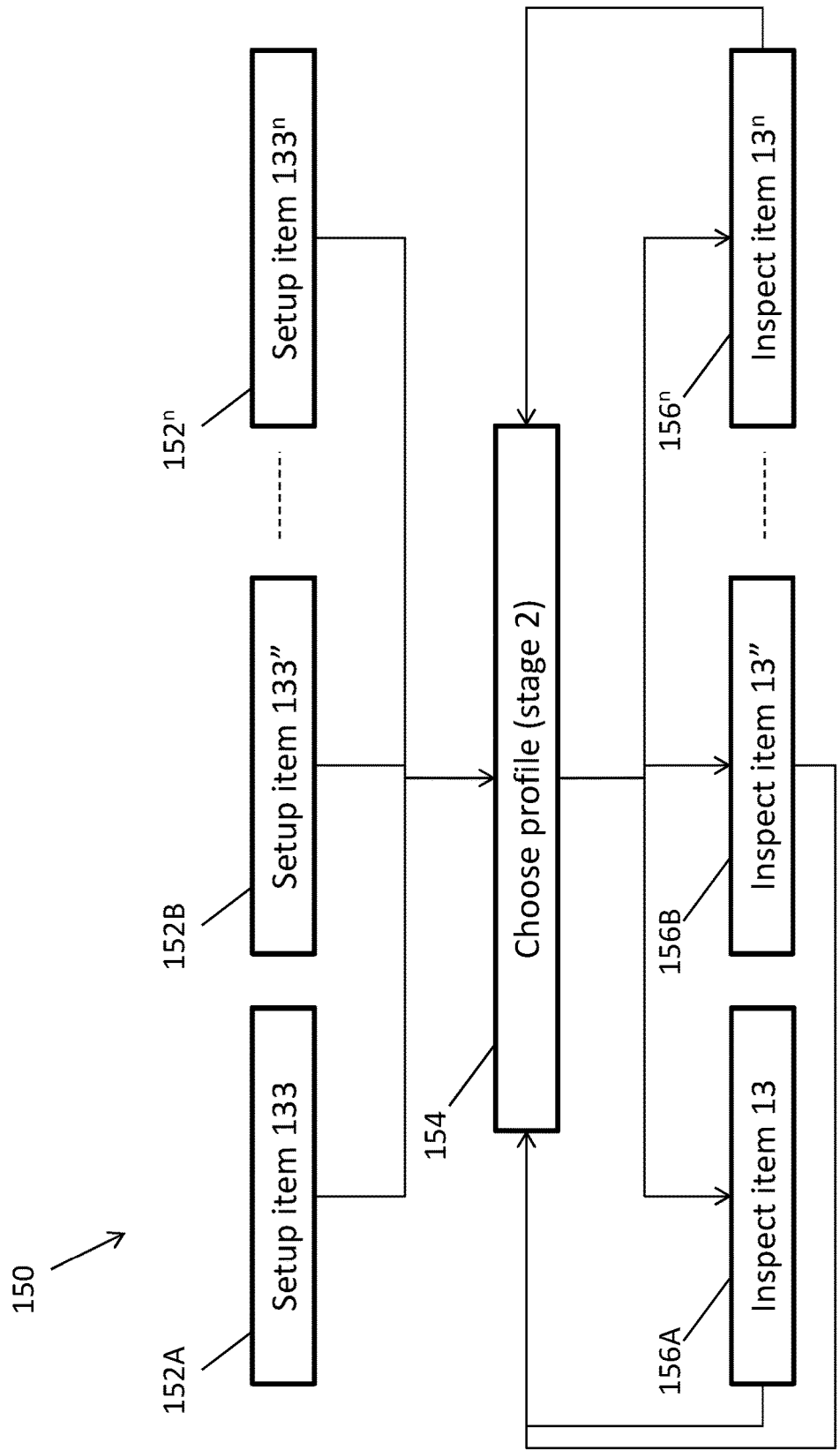
FIGS. 1D and 1P are flow diagrams showing automated visual inspection of multiple product stages on a production line according to embodiments of the present disclosure.
Figure 1F:
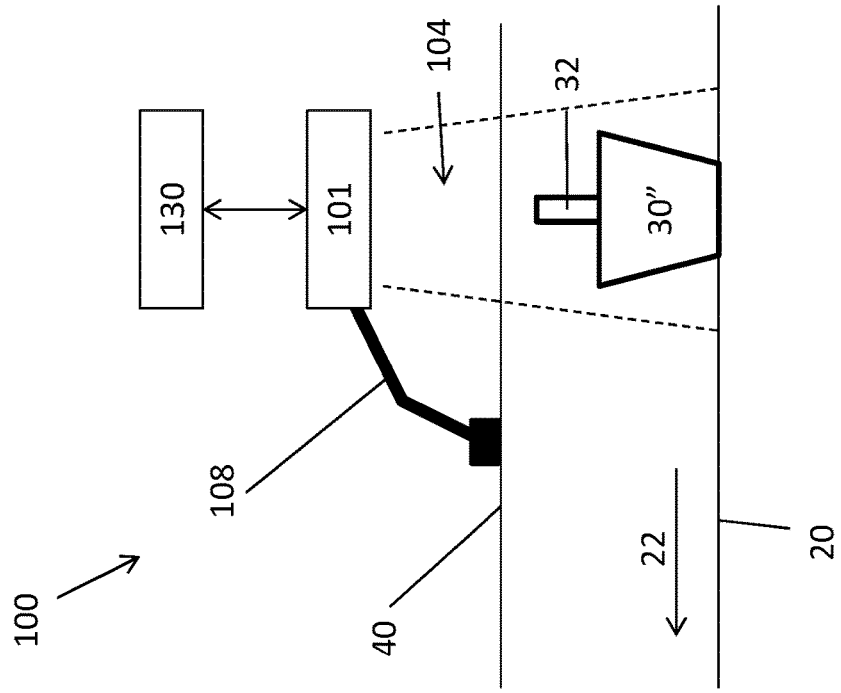
Figure 1E:
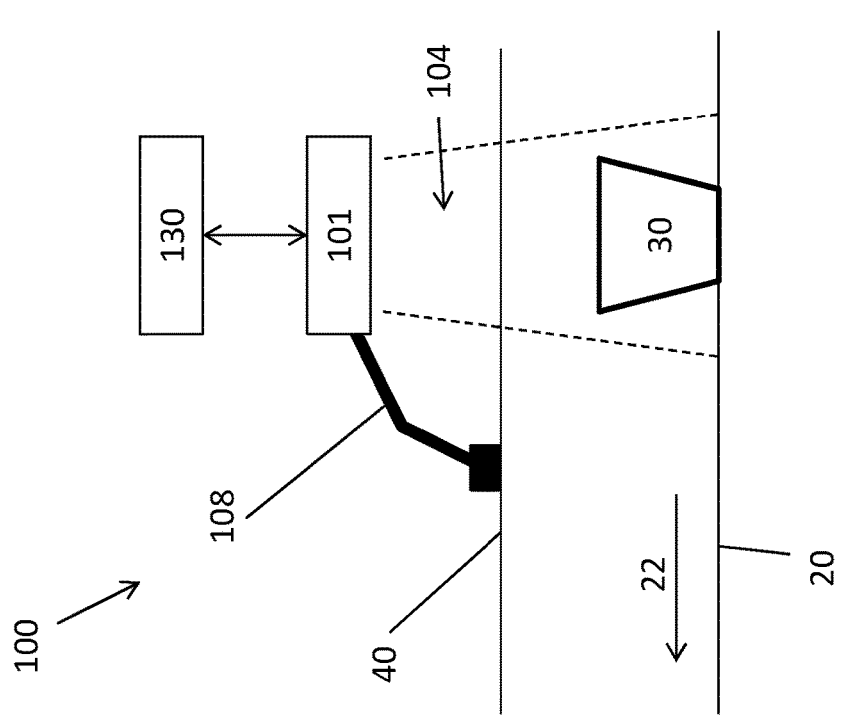
Figure 1H:
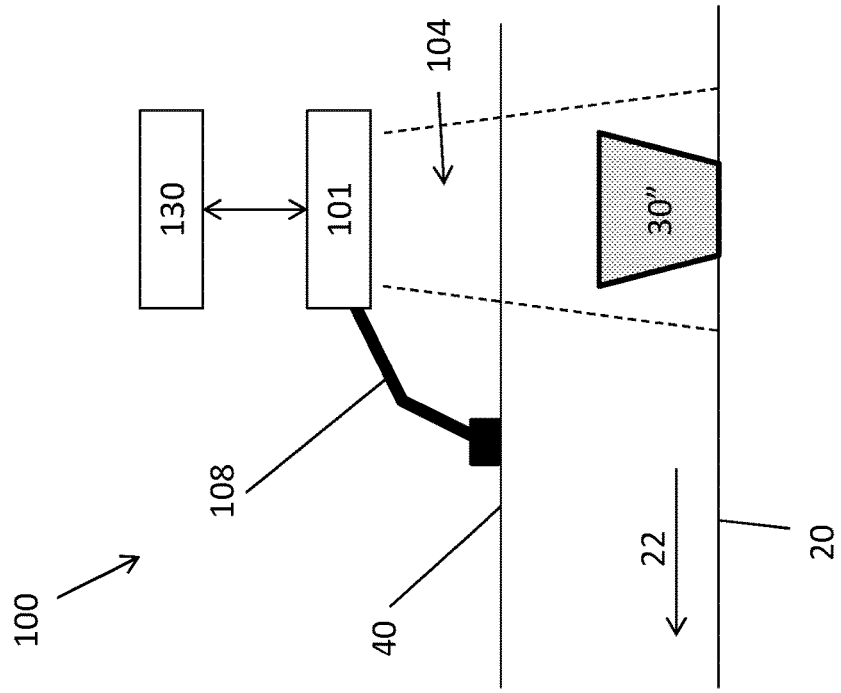
Figure 1G:
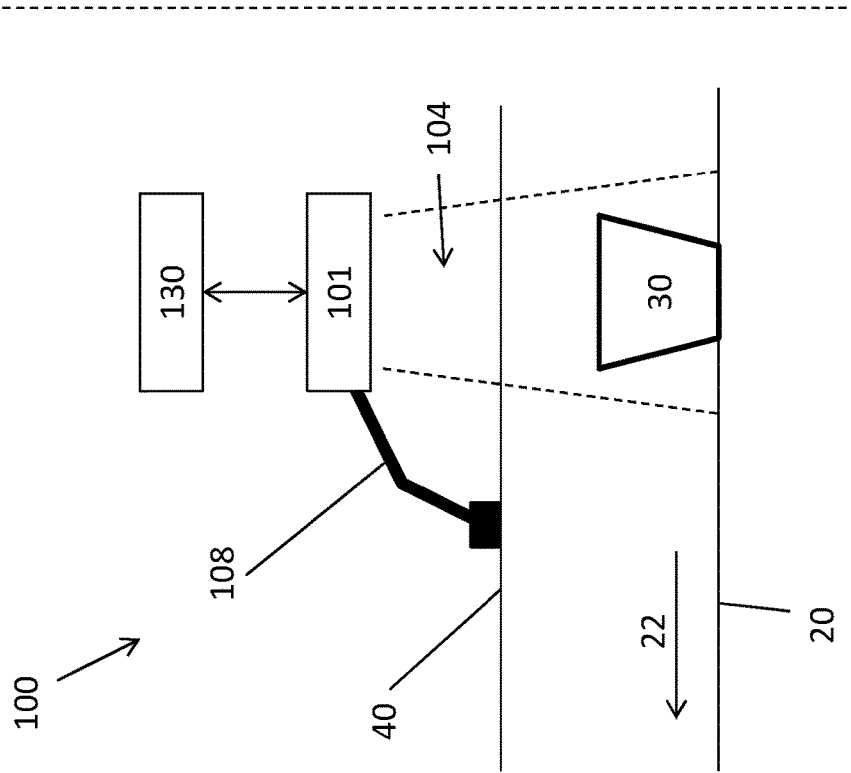
Figure 1J:
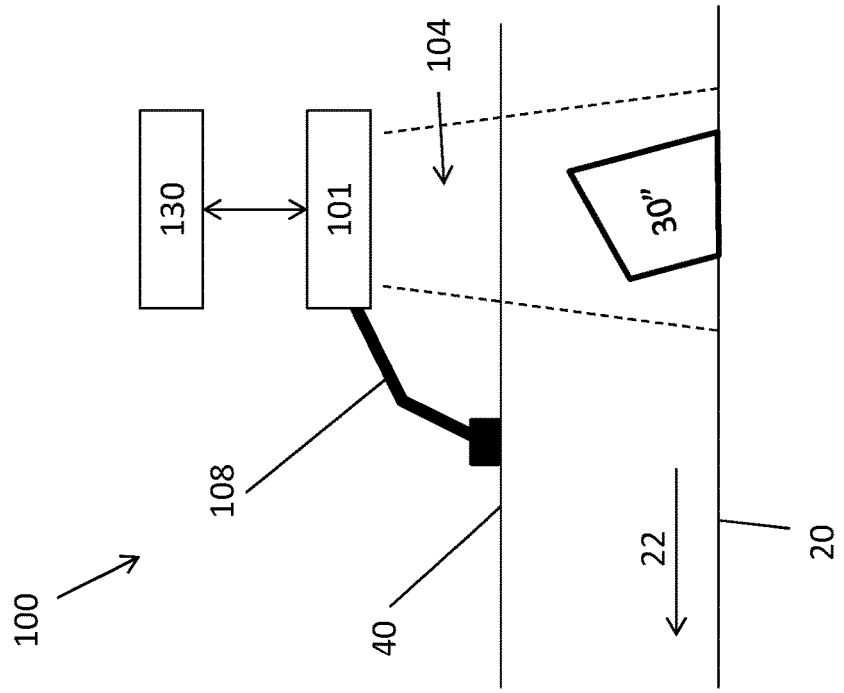
Figure 1I:
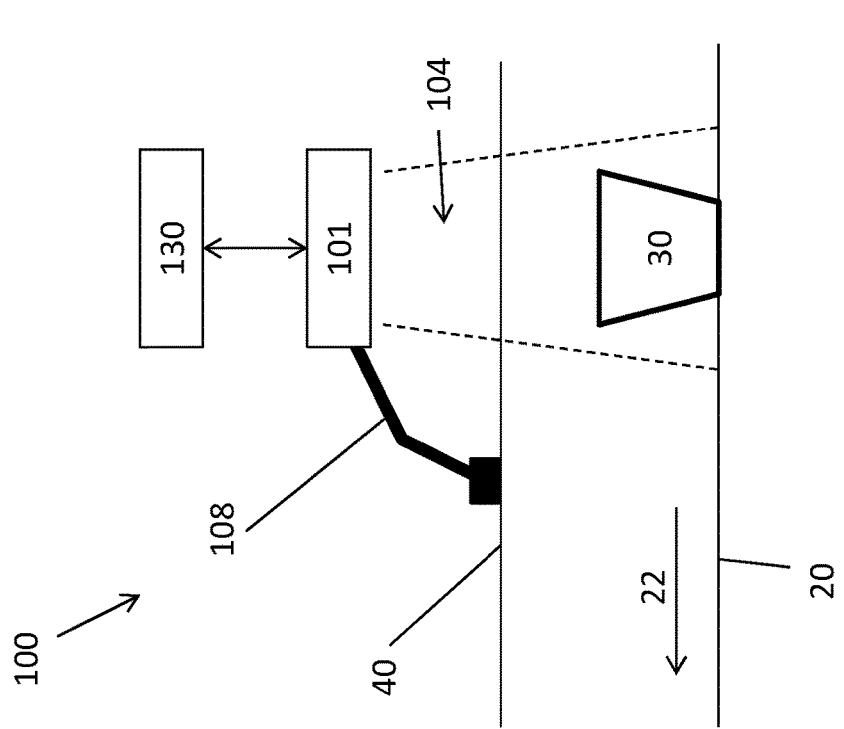
Figure 1K:
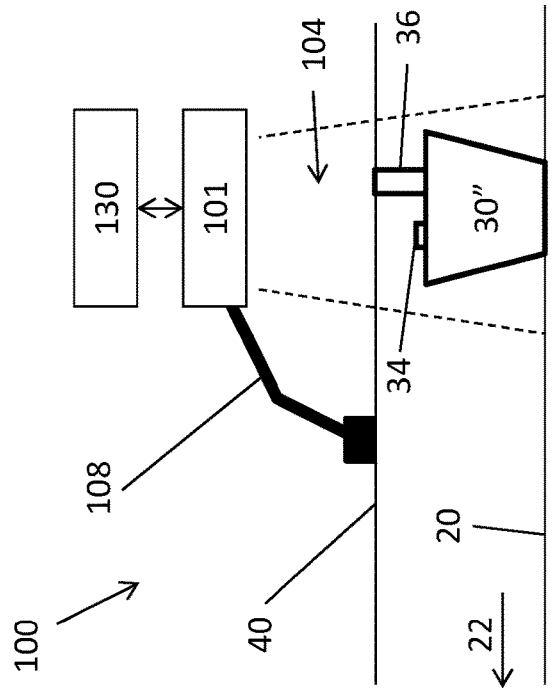
Figure 1M:
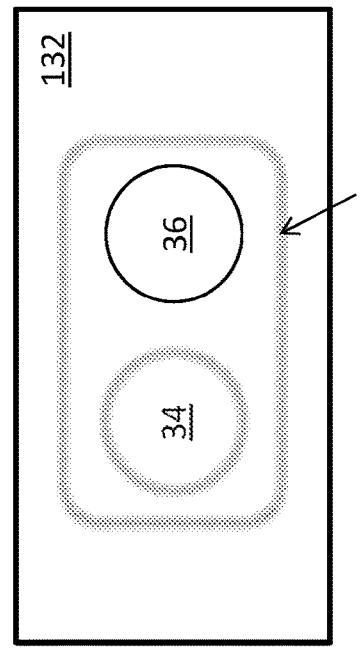
Figure 1L:
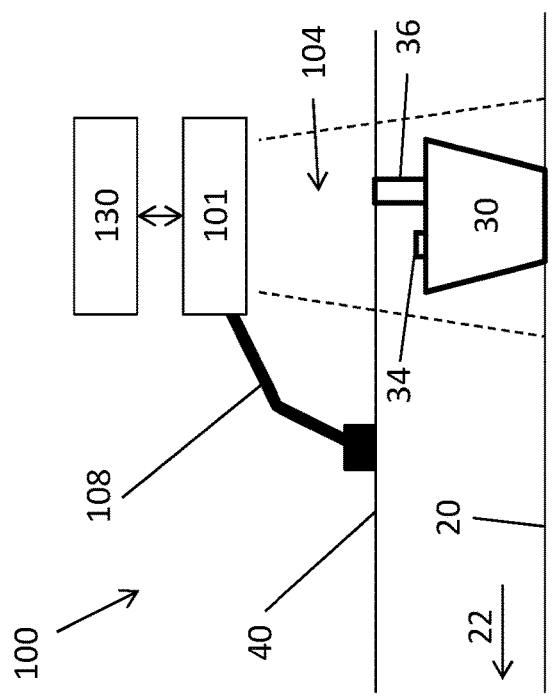
Figure 1N:
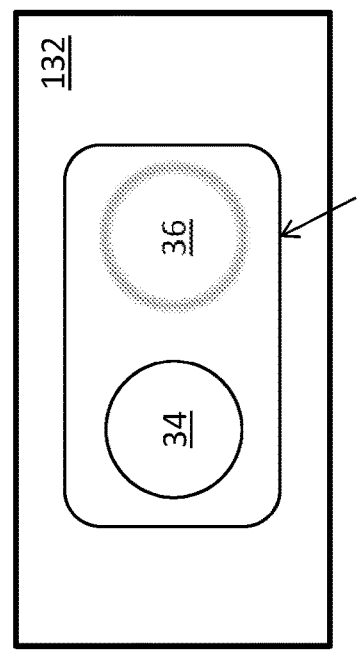
Figure 10:
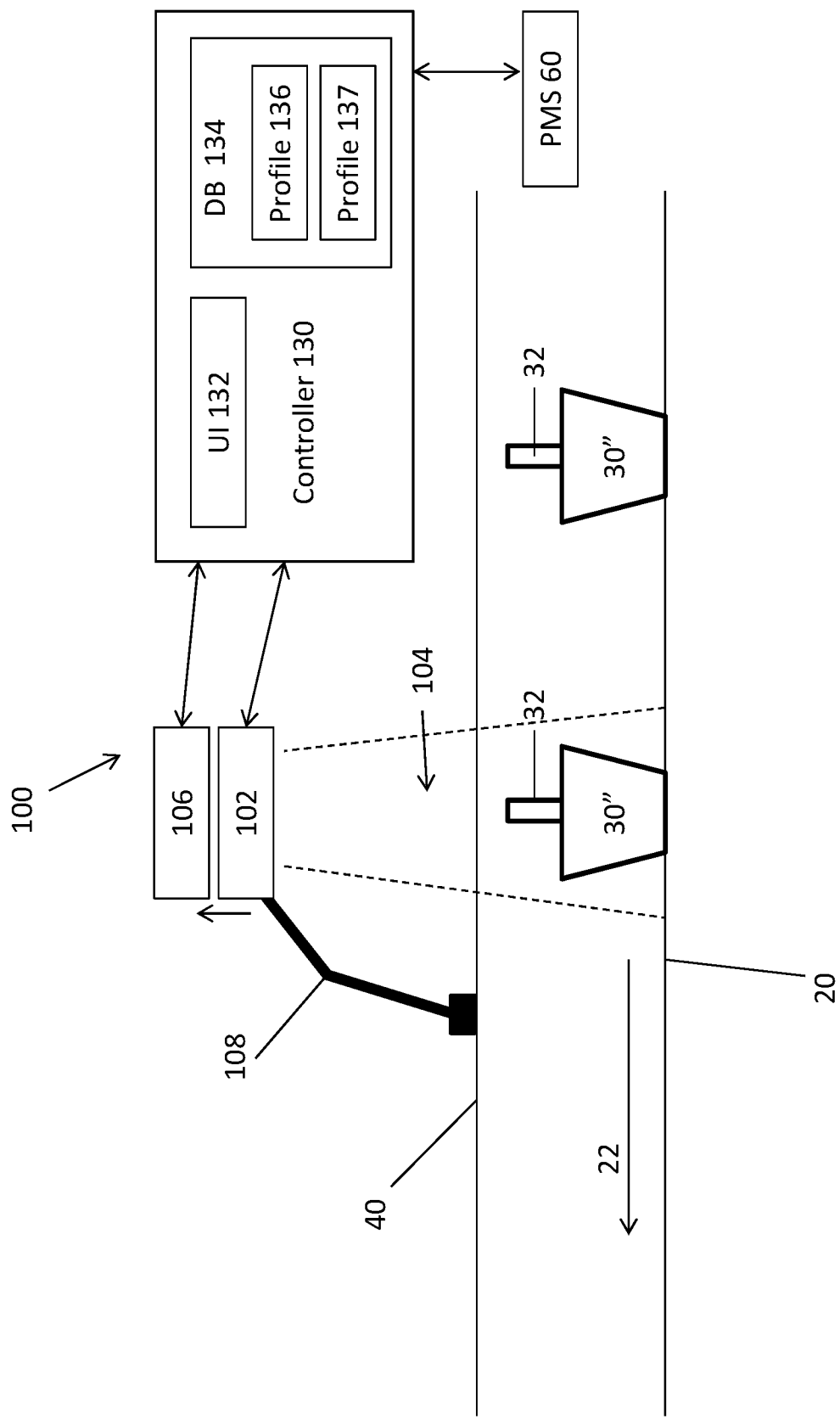
Figure 1P:
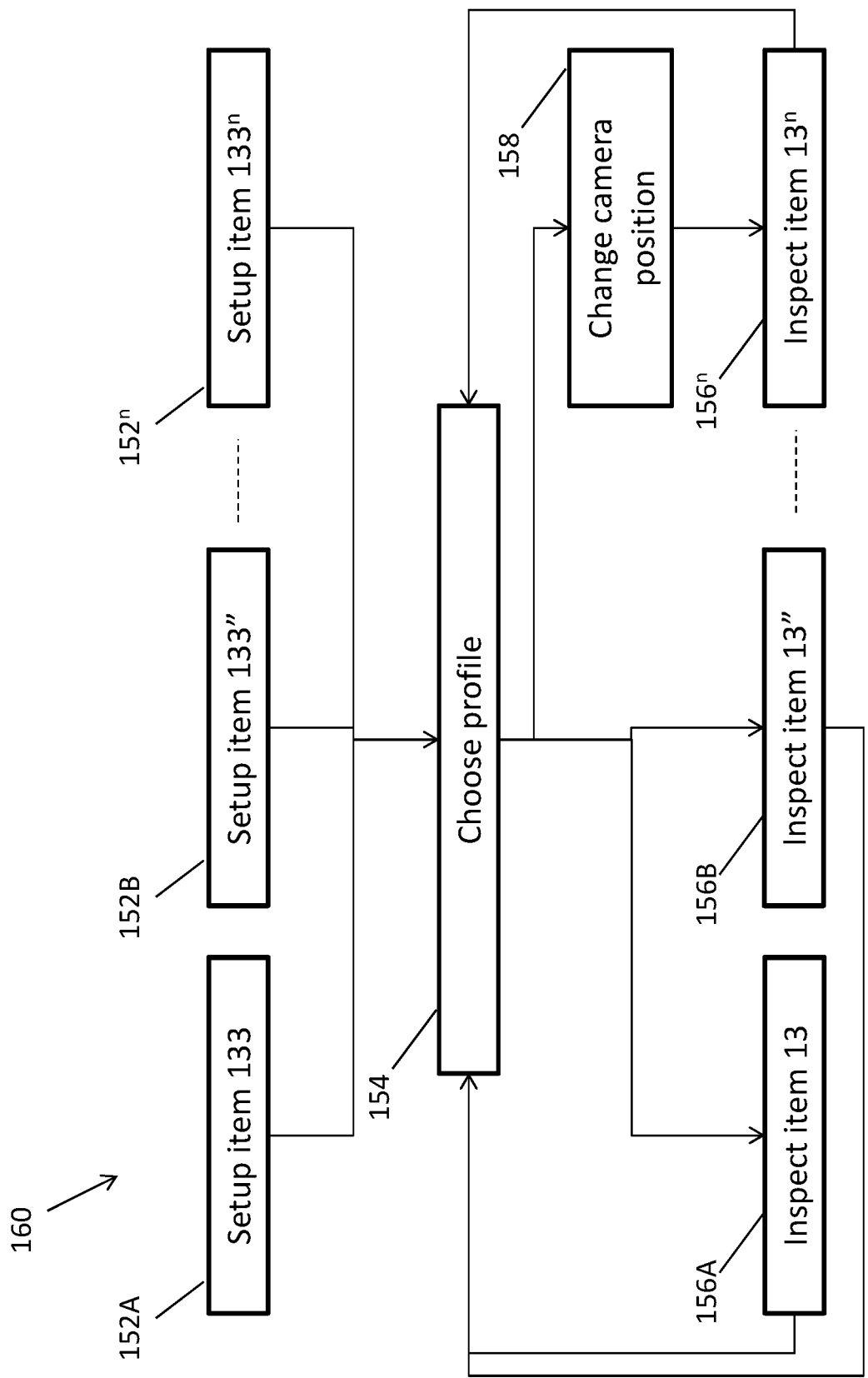

Reference is now made to FIGS. 1A-1P. As shown in FIGS. 1A-1P, an automated visual inspection system 100 comprises controller 130, camera assembly 101, and mount 108. Camera assembly 101 comprises camera 102 and light source 106. System 100 can be provided as an integrated appliance for use in a manufacturing environment.

Camera 102 comprises a CCD or CMOS or other appropriate imaging chip. Camera 102 is a 2D camera or optionally a 3D camera. Optionally camera 102 comprises the camera integrated into a mobile device such as a smartphone or tablet where the device is attached to mount 108. Camera 102 optionally comprises a polarizing lens, tele-centric lens, narrow band or other lens (not shown) placed over the lens of camera 102 or directly upon its imaging chip.

Light source 106 comprises LEDs or other light sources as known in the art. The intensity (brightness) of light source 106 can be adjusted. Optionally, the color of light source 106 can be adjusted. Optionally, light source 106 comprises multiple controllable segments, each of which can be activated or provided with the same or different intensity and/or color. For example, but without intention to be limiting, light source 106 may comprise a circular array of LEDs surrounding camera 102 lens, where radial portions of circular light source 106 are controlled individually or alternatively the intensity and/or color of every LED can be controlled individually. In some embodiments, light source 106 may include special lenses such as a polarizing lens, filter lens, etc.

Light source 106 is shown as positioned above camera 102 for simplicity of the figures but this position should not be considered limiting. Optionally, light source 106 is mounted on the side of or below camera 102. Light source 106 is preferably attached to and surrounds or is otherwise fixed in relation to the lens of camera 102 so as to illuminate the field of view 104 of camera 102. Camera 102 is attached to mount 108 and light source 106 is attached to camera 102. Alternatively, camera 102 and light source 106 are separately attached to mount 108 allowing individual adjustment of either. Mount 108 may include arms, clamps and joints allowing adaptation and adjustment of mount 108 for optimal positioning of camera 102 and/or light source 106.

Camera 102 is positioned using mount 108 such that items 30 to be inspected are within the field of view (FOV) 104 of camera 102. In one embodiment, mount 108 is attached to a mounting surface 40. Surface 40 may remain in a fixed position relative to item 30 or alternatively may move so as to repeatedly bring camera 102 into a position where items 30 are within the field of view 104 of camera 102. A non-limiting example of a moving surface 40 is a robot arm or a moving conveyor on the production line. As above, light source 106 may be attached to camera 102 or mount 108 such that light source 106 illuminates item 30 for inspection. Where reference is made to FOV 104 herein it is to be understood that light source 106 is positioned or controlled to illuminate FOV 104.

Items 30 to be inspected may be placed on an inspection line 20 which comprises means for supporting and moving items 30 such as but not limited to a conveyer belt, or a cradle or another holding apparatus, moving in direction 22, such that first item 30 is brought into FOV 104 followed by second item 30 which is brought into FOV 104, and so forth. Alternatively, items 30 are successively placed in FOV 104 and then removed such as by a robot or human operator.

Camera 102 and light source 106 are in communication with controller 130. Controller 130 may include a computing device as defined herein. Controller 130 may include one or more processors (not shown) such as but not limited to a central processing unit (CPU), a graphics processing unit (GPU), a digital signal processor (DSP), a microprocessor, a controller, a chip, a microchip, an integrated circuit (IC), or any other suitable multi-purpose or specific processor or controller. Controller 130 may control light source 106, for example, by activating it or any of its components or controllable segments as described above, which may or may not be activated, for example, depending on the item being imaged or the inspection lighting environment. Controller 130 possibly alters the intensity or color of light emitted from light source 106 depending on the item being imaged or the inspection lighting environment.

Controller 130 may further include a memory unit (not shown) which stores executable instructions that, when executed by a processor of the controller, facilitate performance of operations of the controller. The memory unit may also store at least part of the image data received from camera 102. Non-limiting examples of memory units include random access memory (RAM), dynamic RAM (DRAM), flash memory, volatile memory, non-volatile memory, cache memory, a buffer, a short-term memory unit, a long-term memory unit, or other suitable memory units or storage units.

In some embodiments controller 130 creates an item profile which includes data from images of defect-free items (in the same category) on the production line. The controller 130 applies a defect detection algorithm on an image of a same-category item on the production line to determine, based on the item profile, if the same-category item has a defect.

In some embodiments, controller 130 includes a profile database 134 which may be stored in the memory unit.

Controller 130 may further comprise or may be in communication with a user interface (UI) 132. UI 132 may comprise a monitor or screen and notifications to a user may be displayed visually on the monitor or screen (e.g., text or other content displayed on the monitor). Alternatively or additionally, UI 132 may include a light that may light up or change color. Alternatively or additionally, UI 132 may include an audio player to emit a sound. UI 132 possibly comprises means for accepting user input such as a touch screen, keyboard and/or mouse. Optionally, UI 132 is provided on a multi-purpose device such as a smartphone, tablet or personal computer.

Controller 130 is optionally in communication with a manufacturing production line management system (PMS) 60 such that the inspection activity of system 100 is optionally coordinated with the production line as will be described further below. PMS 60 controls the production line, such as by interfacing to programmable-logic-controllers governing the production line. Alternatively, PMS 60 may include an autonomous manufacturing machine, such as a robotic arm with one or more functions on the manufacturing line. PMS 60 may include any system that provides an external indication to system 100 of a change in the manufacturing stage. PMS 60 preferably interfaces with system 100 using an industry-standard API. All or some of the components of system 100 and also PMS 60 may be in wired or wireless communication.

As shown in FIG. 1D, to prepare for and prior to production line inspection, system 100 may perform a setup process 150 for each product or stage/item that is to be inspected. In the setup step 152A, at least two or more defect free samples of a manufactured item 133 of the same category, are placed in succession within field of view 104 of camera 102. Each defect free sample of item 133 is imaged by camera 102. These images, which may be referred to as setup images, are optionally obtained by using different imaging parameters of camera 102 and lighting parameters of light source 106. The images comprise image data such as pixel values that represent the intensity of reflected light as well partial or full images or videos.

The setup images are analyzed by controller 130 using computer vision techniques, such as machine learning/artificial intelligence (AI) and computer vision algorithms to create a complete representation of item 133, for example, to collect information regarding possible 2D shapes and 3D characteristics of item 133 or to find uniquely discriminative features of item 133 and the spatial relation between these unique features. The analysis of set up images can be used to determine parameters such as an optimal focus, to obtain aligned images by registration of the images, to detect an external boundary of the item, and so on, which can be used to detect a same-category item in a new image, e.g., during the inspection stage.

In embodiments of the invention the analysis results may be used in the creation of a profile 136 (described further below) and are then used by a defect detection algorithm applied on images of items during a later inspection stage (e.g., steps 156 A-156n), for defect detection, counting, gating or sorting on the production line.

Based on the information collected from defect-free items 133, controller 130 can detect and inspect further items of the same type even if these further items were not previously presented, and determine whether these are defect-free. This allows controller 130 to detect a defect on an inspected item based on analysis of defect-free items. Optionally, defect detection is performed on one or more "regions of interest" (ROI) also referred to herein as "inspection areas" (IA) which are specific areas of the full image representing a specific inspection area on the item.

Once it is determined, based on the analysis of the setup images, that enough information about item 133 has been obtained, the setup step 152A is concluded. Setup is preferably performed only once per item/stage of manufacture. Alternatively, setup may be redone such as where changes are made to an item of following feedback that the setup needs to be improved. Following the completion of setup step 152A, profile 136 which describes item 133 and the setup of system 100 for inspecting item 133 is stored in database 134. Profile 136 preferably includes data from images of same-category defect-free items on the production line, for example:

Images that were approved as showing defect-free samples, e.g., by the operator of the production line;

Item 133 boundaries in the images, as automatically detected and/or as defined by the operator of the production line;

Specific inspection areas (IA) of item 133 for inspection and any relevant data associated with them, including but not limited to their order of inspection, the action to be taken upon detection of defects within them and so forth;

Optimal camera parameters including but not limited to iris, exposure, focus, white-balance, etc.;

Properties of the items 133 on the production-line including but not limited to velocity, direction and magnitude of items 133 on the conveyer belt, spatial properties of items 133 in the area sampled by the camera (the set of locations in which the item can be detected), etc.

Compositional properties of items 133 including but not limited to rotation and scale in the sampled area and compositional properties relative to one another;

Indication of parts of item 133 that move independently of other parts;

Typical image data values for the item 133 for different illumination source parameters and different and possibly related camera parameters which may require retuning, including but not limited to: entropy values in different camera setups, histogram typical values, standard deviations and other statistical properties, etc.;

Properties related to the optimal detection of the alignment of the item including but not limited to: optimal techniques for detecting interest points on the item, the threshold and scales for a good interest point on the item, descriptor types for the interest points having the best matching properties for matching these interest points between different samples of the item, etc.;

Other attributes related to the items, that were calculated during the setup stage and that facilitate fast switching between profiles without requiring recalculation from the defect-free samples, including but not limited to interest points on the items, item rotational and scale variant and invariant descriptors, compositional properties, other results of the setup optimization processes, etc.

In some embodiments a profile can include, in addition to data from images, one or a combination of instructions and information for a user, e.g., production line operator, including but not limited to:

instructions for initiating inspection of the item, actions in case of defect detection, etc;

Item description;

Other archiving information, such as but not limited to the shift manager on duty, the plant name and address, factory number, etc.;

Date of setup;

Positioning of mount 108 including but not limited to number of arms, angles between the arms, angle of camera, locations and/or distances of items from the camera etc.;

Lighting parameters of light source 106 including but not limited to intensity of illumination, rotation of polarizing lens, activation of filter lens, directionality of LEDs, intensity level of different color channels, intensity/color per LED, intensity/color per radial segment, etc.;

Collected data related to the item, detected defects, and the production environment. Collected data includes but is not limited to: number of items scanned, number of defects detected, positions of defects, items per day, staff on duty, etc. This data is optionally provided to external applications. Non limiting examples of external applications include big data mining applications such as for analyzing item production quality; and Data relating to a relationship between different category items (as further detailed below).

In step 154B, the same setup process as performed for item 133 in step 154A is performed for item 133" to create a profile 137 for item 133". Multiple alternative relationships between item 133 and item 133" can be contemplated, such as:

As shown in FIGS. 1E and 1F, item 30" is another stage of the assembly of a product comprising, for example, the addition of part 32 (as in FIGS. 1B, 1F) to item 30 to create item 30".

As shown in FIGS. 1G and 1H, item 30" is the same item as item 30 but has undergone a manufacturing process which has altered item 30, for example but not limited to sealing a component of item 30 or painting of item 30 thus creating item 30";

As shown in FIGS. 1I and 1J, item 30" is the same item as item 30 where another side or part of item 30 is presented to camera 102 for inspection. As a non-limiting example, complete inspection of item 30 may require inspection of item 30 from multiple angles and an operator or automated system (robot arms, conveyor or similar) presents different aspects of item 30 to camera 102 for inspection;

As shown in FIGS. 1K-1N, item 30″ is the same item as item 30 where item 30 and camera assembly 101 do not necessarily change position but where the camera and lighting settings for camera assembly 101 are different for item 30 and 30″ resulting in different item profiles. In a non-limiting example (as shown in FIGS. 1M and 1N which are exemplary screens of GUI 132 showing captured images of items 30 and 30″), a surface of item 30 may comprise parts with different heights extending towards camera 102, such as parts 34 and 36, that require different focus settings in camera 102. As shown in FIG. 1M, focus settings in camera 102 capture a first image at one focus setting (item 30, profile 136) for parts at a first height, such as part 34, (where part 36 is shown as out of focus). As shown in FIG. 1N, focus settings in camera 102 capture a second image at another focus setting (item 30″, profile 137) for parts at a second height, such as part 36, (where part 34 is shown as out of focus). In a further non-limiting example, an item 30 may comprise different material types that reflect light differently and thus require different exposure settings in camera 102 and different lighting settings in light source 106 to capture a first image at one exposure/lighting setting (item 30, profile 136) and a second image at another exposure/lighting setting (item 30″, profile 137).

It should be appreciated that although the above alternatives refer to two items (30 and 30″), any of these alternatives may comprise more than two items.

Profiles 136 (item 30) and 137 (item 30″) and every profile for every item may further include information about the relationship of each item to each other item and optionally to a product that comprises these items. Such information may include:

Name, details of product being produced;

Product stage identifier;

Expected sequence of inspection of this item relative to other items, as will be described further below;

Item Group: a list of items having a relationship to one another including the type of relationship. Every profile for every item in the group will typically list the group such that loading the item profile provides an indication of the other items expected in the group as described further below.

Product Group: a list of items that, together with this item, form a product. Every profile for every item in the group will typically list the group such that loading the item profile provides an indication of the other items expected in the group as described further below.

Following the setup step 152B for item 133″, profile 137 describing item 133″ is stored in database 134. Step 152n represents the nth setup process for the nth product stage of the product which results in another profile stored in database 134. It should therefore be appreciated that any number of product stages may be set-up and the example presented herein should not be considered limiting.

In step 154, as preparation for the inspection stages, the profile (136, 137, etc.) corresponding to the product stage to be inspected is selected. The selection of the profile can be performed in one or more of the following ways:

An operator selects the profile using GUI 132 such as in the exemplary screenshot of FIG. 1C;

The profile is chosen by an external system, e.g., PMS 60 based on a pre-conditioned program, such as, the plant production schedule or other programs, for example, as detailed below:

The profile is chosen following completion of inspection of a predetermined number of another item as identified in the item group or product group field;

The profile is chosen based on item detection by system 100, typically by object detection algorithms applied by controller 130. After choosing a profile controller 130 may switches to a new item profile. Optionally an operator initiates or approves the change in profile based on item detection;

Where system 100 is integrated into an autonomous manufacturing machine, such as a robotic arm with one or more functions on the manufacturing line, the profile may be chosen by the manufacturing machine;

Sequential connected items: Following inspection of an item 133 and determination that the item 133 is defect free including all the IAs of that item 133, the profile of the subsequent item 133″ as defined in the item group or product group field of the profile of the current item 133 is loaded for inspection of subsequent item 133″. Although items 133 and 133″ have been used here to explain the concept of sequential connected items it should be appreciated that any two or more items could be sequential connected items. In one embodiment, an item group or product group determination of a defect free product depends on all items in that group being sequentially determined as defect-free;

Connected group items: Where the profile of a currently inspected stage comprises an item group or a product group field, system 100 expects subsequent items to belong to this group and will complete inspection (and indicate a defect free item) only following completion of defect free inspection of each item in the group (including all IAs)—whether inspected sequentially or randomly. Attempts to inspect an item from the group that has already been inspected will be rejected by system 100. The profiles are loaded based on automatic detection of the item by system 100, typically by controller 130, or following selection by an operator—but chosen items must be those of the group that have not yet been inspected;

Repeat connected items: The subsequent item profile is selected by an operator based on defect free determination of the current item including all IAs. Thus, an item found to have a defect may be repaired and a re-inspection of the item initiated by the operator. The re-inspection is optionally blocking i.e.: subsequent items may not be inspected until the faulty item is corrected. Alternatively, other items may be inspected but the determination of a defect free product depends on every item in the group being determined to be defect free.

Based on one of the above mechanisms the selected profile is loaded by controller 130 and used as a basis for inspection of the related item to determine if defects are present in that item.

In the inspection step 156A, items which are of the same type as the (defect-free) sample items and which may or may not have defects, are imaged by camera 102. The images, which may be referred to as inspection images, are processed by controller 130 using a defect detection algorithm (e.g., using machine learning/AI algorithms) to detect defects in items (or for gating, counting or sorting). In step 156A item 13 is inspected based on profile 136.

Similarly, such as in steps 156B-156n, other items such as 13″ to 13n are inspected for defects. GUI 132 preferably provides notification regarding inspected items found to be free of defects. Exemplary methods of notification include but are not limited to visual indication, audio indication, or a combination of these. A visual indication might for example comprise a green rectangle surrounding the view of the item on GUI 132 or a green flash of light, or a relevant icon presented on GUI 132. Optionally system 100 provides a defect free notification to PMS 60. Optionally, an image of the defect free item is archived such as in DB 134 optionally along with a timestamp or barcode. Following indication of a defect free item, system 100 indicates readiness to inspect a subsequent item. A non-limiting example of a visual indication of readiness comprises a different color (e.g., grey) rectangle surrounding the view of the item on GUI 132. Depending on the item/product stage sequence, an indication is preferably provided of the profile in use, of a profile change, and of the expected product stage/item that system 100 is waiting to inspect.

Preferably, system 100 certifies products comprising product stages as defect free only following a defect free assessment of every product stage. As above, system 100 provides options for the sequence of inspection of each product stage but enables determination of the defect status of a product by connecting the product stages that make up that product and enabling simple switching for inspection of each product stage.

GUI 132 may also provide notification regarding inspected items found to have a defect. Exemplary methods of notification include but are not limited to visual indication, audio indication, or a combination of these. A visual indication might for example comprise a red rectangle surrounding the view of the item on GUI 132. Optionally, an image of the defective item is archived such as in DB 134 optionally along with a timestamp or barcode. Optionally, system 100 indicates that no further inspection can take place until the defective item is removed or re-inspected and found to be defect-free. Optionally the production line is halted. Optionally a notification means on the production line is activated such as but not limited to a flashing light or audible alarm.

Depending on the item/product stage sequence, an indication is preferably provided of the profile in use, of a profile change, and of the expected product stage/item that system 100 is waiting to inspect. Optionally different alerts may be provided for defects detected on different parts of inspected items. Optionally items that are defective are marked in some way or removed from the production line. Optionally, PMS 60 is informed about defective items.

Optionally a setup step such as 152B may take place after inspection step 156A, i.e. additional profiles for items may be added at any time and added to the profile database 134. Inspection steps 156A-156n may also be implemented in any order depending on the needs of the manufacturing plant and the connection of the product stages. Further, as above, the number or order of inspection steps 156A-156n is not limited.

As shown in FIGS. 1O and 1P, camera assembly 101 is optionally moved so as to alter its FOV 104 to accommodate a specific item or view of item. The movement of camera assembly 101 is optionally performed automatically using automated mechanical means such as but not limited to a robotic arm. Alternatively, mount 108 is manually or automatically adjusted as needed. In such an optional embodiment, the process flow 160 is the same as process 150 shown in FIG. 1D with the exception of step 154 (FIG. 1P) which comprises choosing the correct profile of the item to be inspected and is followed by step 158 for moving camera 102 before inspection step 156 can commence. Prior to inspection of another item (such as step 156A or 156B) camera assembly 101 is returned to the correct position for inspection of that particular item.

Figure 2A:
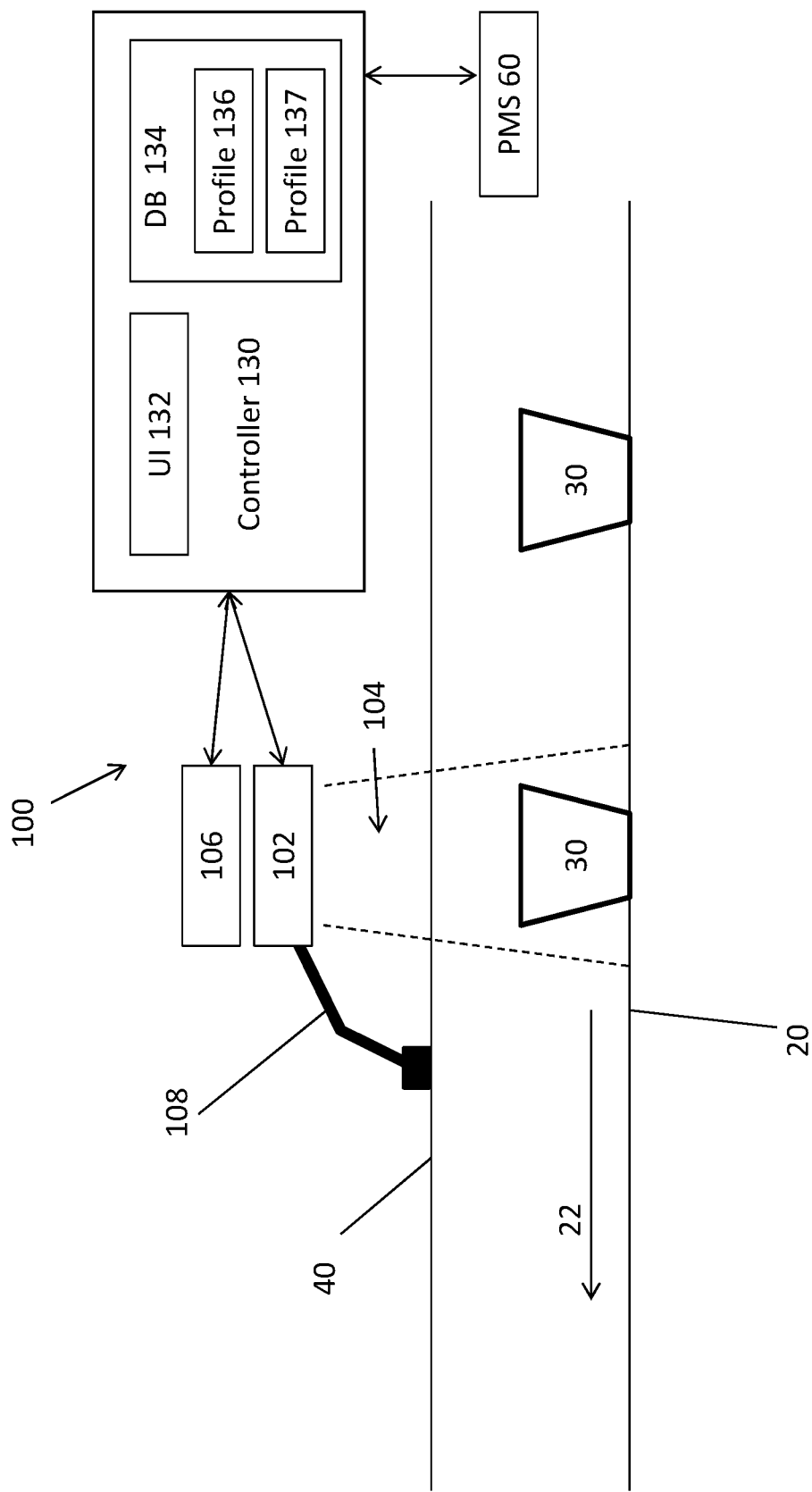
FIGS. 2A, 2B, and 2D are illustrative schematic drawings showing automated visual inspection of multiple products on a production line according to embodiments of the present disclosure.
Figure 2B:
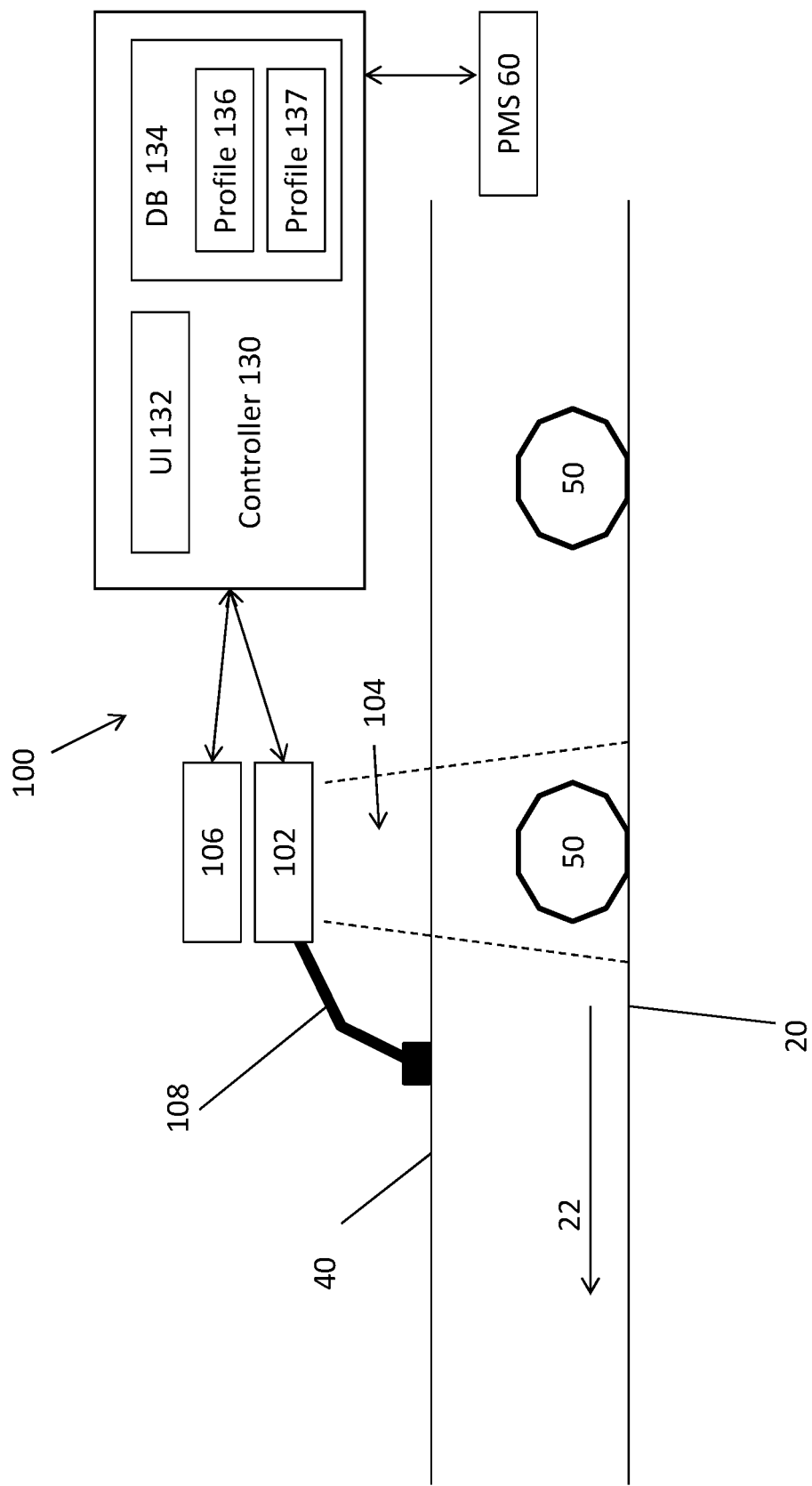

Reference is now made to FIGS. 2A, 2B, 2D and 2C, 2E which are respectively illustrative schematic drawings and flow diagrams showing automated visual inspection of multiple products on a production line according to at least some embodiments of the present disclosure. As shown in FIGS. 2A-2B, an automated visual inspection system 100 is provided as described above with reference to FIGS. 1A-1B. As shown in FIGS. 1A-1B, system 100 comprises controller 130, camera 102, light source 106, and mount 108. System 100 is preferably provided as an integrated appliance for use in a manufacturing environment.

Camera 102 is positioned using mount 108 such that items 30 and 50 to be inspected are within the field of view (FOV) 104 of camera 102. As above, light source 106 is attached to camera 102 or mount 108 such that light source 106 illuminates items 30 and 50 for inspection. Where reference is made to FOV 104 herein it is to be understood that light source 106 is positioned or controlled to illuminate FOV 104.

Items 30 and 50 are different products or different parts of different products manufactured on the same production line and system 100 preferably remains in the same position relative to the production line for inspection of both products 30 and 50.

Mount 108 is attached to a mounting surface 40. Surface 40 may remain in a fixed position relative to items 30, 50 or alternatively may move so as to repeatedly bring camera 102 into a position where items 30, 50 to be inspected are within the field of view 104 of camera 102. A non-limiting example of a moving surface 40 is a robot arm or a moving conveyor on the production line.

Items 30, 50 to be inspected may be placed on an inspection line 20 which comprises a means for supporting and moving items 30 or 50 as described above with reference to FIG. 1A moving in direction 22 such that first item 30, or 50 is brought into FOV 104 followed by second item 30, or 50 which is brought into FOV 104, and so forth. Alternatively, items 30 or 50 are successively placed in FOV 104 and then removed such as by a robot or human operator.

Camera 102 and light source 106 may be in communication with controller 130 as described above with reference to FIGS. 1A and 1B.

Figure 2C:
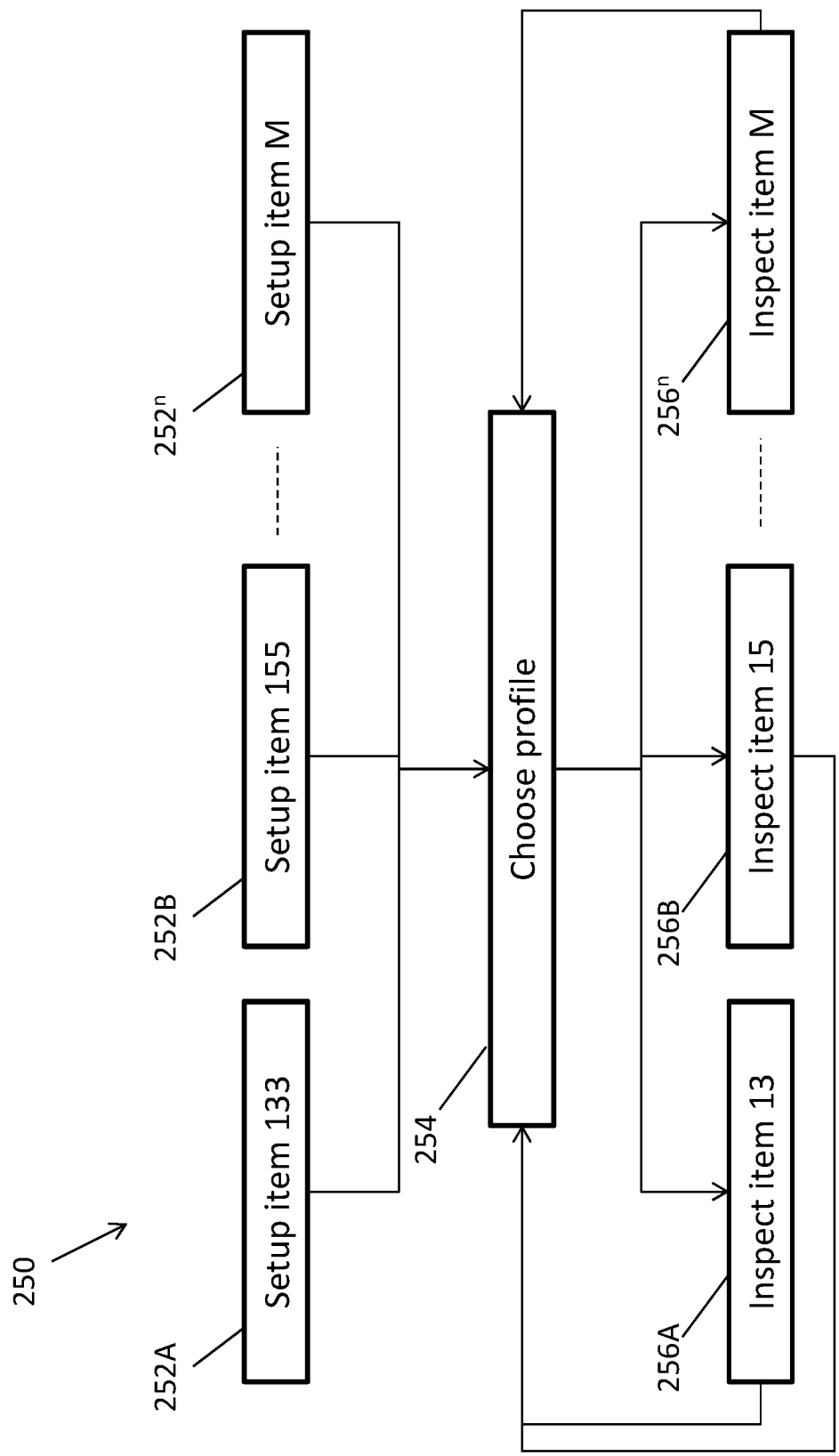
FIGS. 2C, 2E and flow diagrams showing automated visual inspection of multiple products on a production line according to embodiments of the present disclosure.

As shown in FIG. 2C, to prepare for production line inspection, system 100 requires a setup process 250 for each product or stage of an item that is to be inspected. In the setup step 252A, at least two or more defect free samples of a manufactured item 133 of the same type are placed in succession within field of view 104 of camera 102. Each defect free sample of item 133 is imaged by camera 102. Setup images, are obtained and analyzed by controller 130 as described above.

Following the completion of the setup stage, profile 136 which describes item 133 and the setup of system 100 for inspecting item 13 is stored in database 134. Profile 136 preferably comprises parameters and characteristics as defined above with reference to FIG. 1C.

In step 252B, a similar setup process is followed for item 155 which is another product or part manufactured on the same production line as item 133. Following the setup stage for item 155, profile 137 describing item 155 is stored in database 134. Step 252n represents the nth setup process for the Mth manufactured item on the same production line which results in another profile stored in database 134. It should therefore be appreciated that any number of products/items may be setup and the example presented herein should not be considered limiting.

In step 254, as preparation for the inspection stages, the profile (136, 137, etc.) corresponding to the item to be inspected is selected. The selection of the profile is performed in one or more of the ways described above with reference to FIG. 1C (excluding profile selection means that are exclusively product stage related).

The selected profile will be loaded by controller 130 and used as a basis for inspection of the related manufactured item to determine if defects are present in that manufactured item (13, 15, M).

In the inspection step 256A, items which are of the same type as the (defect-free) sample items and which may or may not have defects, are imaged by camera 102. The images, which may be referred to as inspection images, are processed by controller 130 using a defect detection algorithm (e.g., using machine learning/AI algorithms) to detect defects in items. In step 256A item 13 is inspected based on profile 136.

Similarly, such as at steps 256B-256n, other items such as 15 to M are inspected for defects. Notifications for defect free and defective items may be provided as described above with reference to FIG. 1C.

Optionally a setup step such as 252B may take place after inspection stage 256A, i.e. additional profiles for additional items may be added at any time and added to the profile database 134. Inspection steps 256-A256n may also be implemented in any order depending on the needs of the manufacturing plant. Further, as above, the number or order of inspection steps 256A-256n is not limited.

Figure 2D:
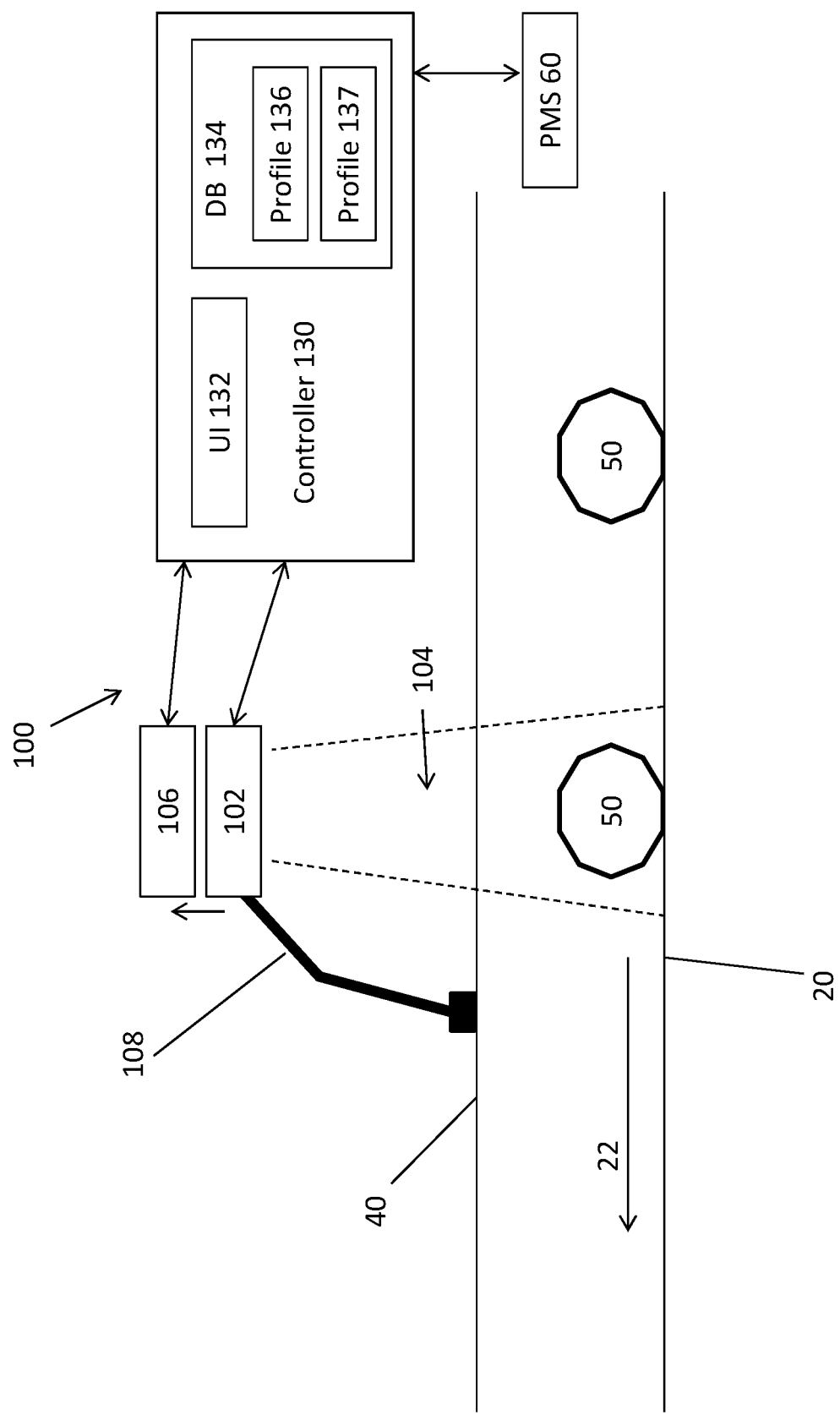
Figure 2E:
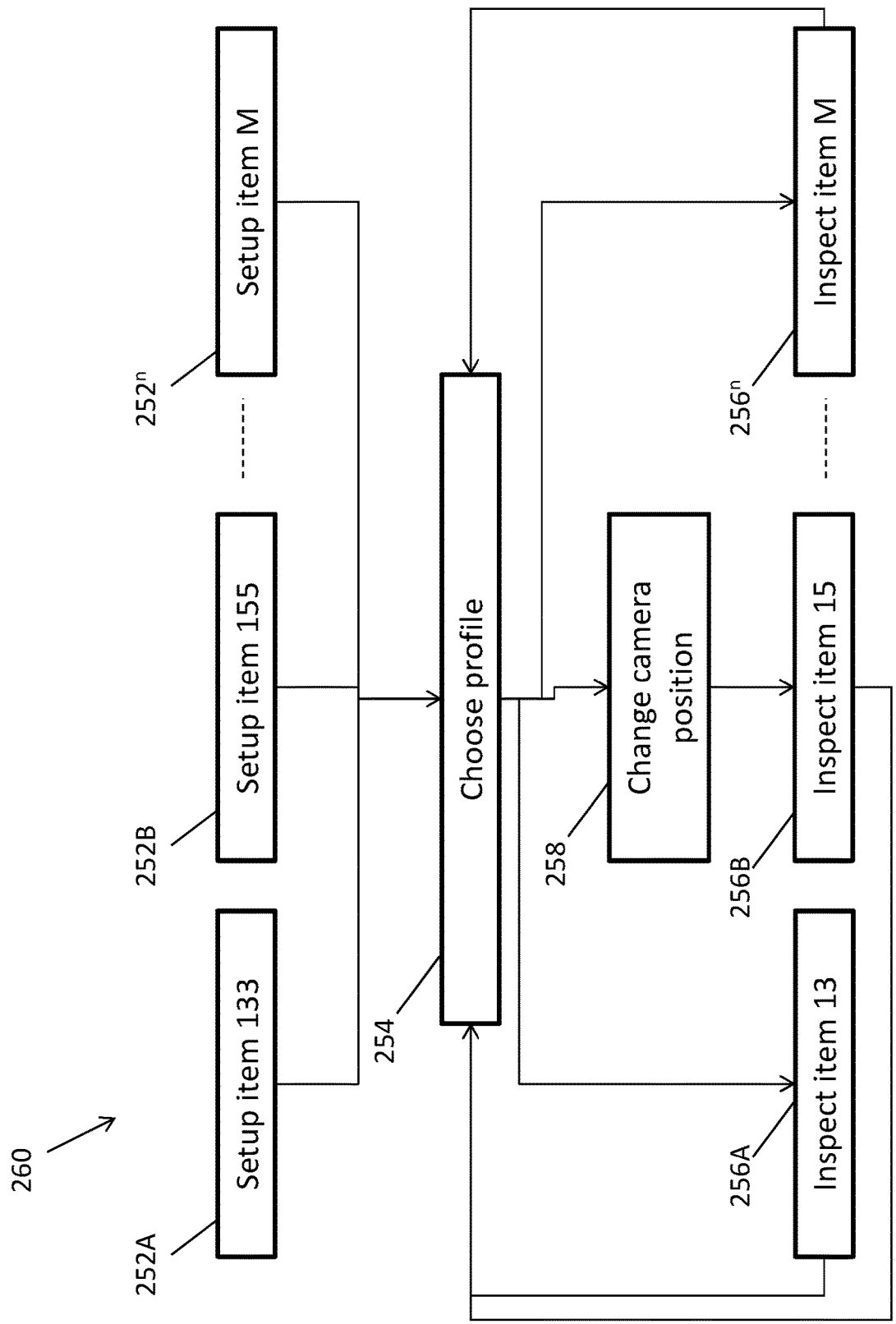

As shown in FIGS. 2D and 2E, camera 102 is optionally moved so as to alter its FOV 104 to accommodate a specific manufactured item 50. The movement of camera 102 is optionally performed automatically using automated mechanical means such as but not limited to a robotic arm. Alternatively mount 108 is manually adjusted as needed. In such an optional embodiment, the process flow 260 is the same as shown in FIG. 2C with the exception of step 254 (FIG. 2E) which comprises choosing the correct profile and is followed by 258 for moving camera 102 before inspection step 256B can commence. Prior to another inspection step (such as 256A or 256n) camera 102 is returned to the correct position for inspection in that particular step. Optionally camera 102 is moved for inspection of another item such as at 256A or 256n.

Figure 3A:
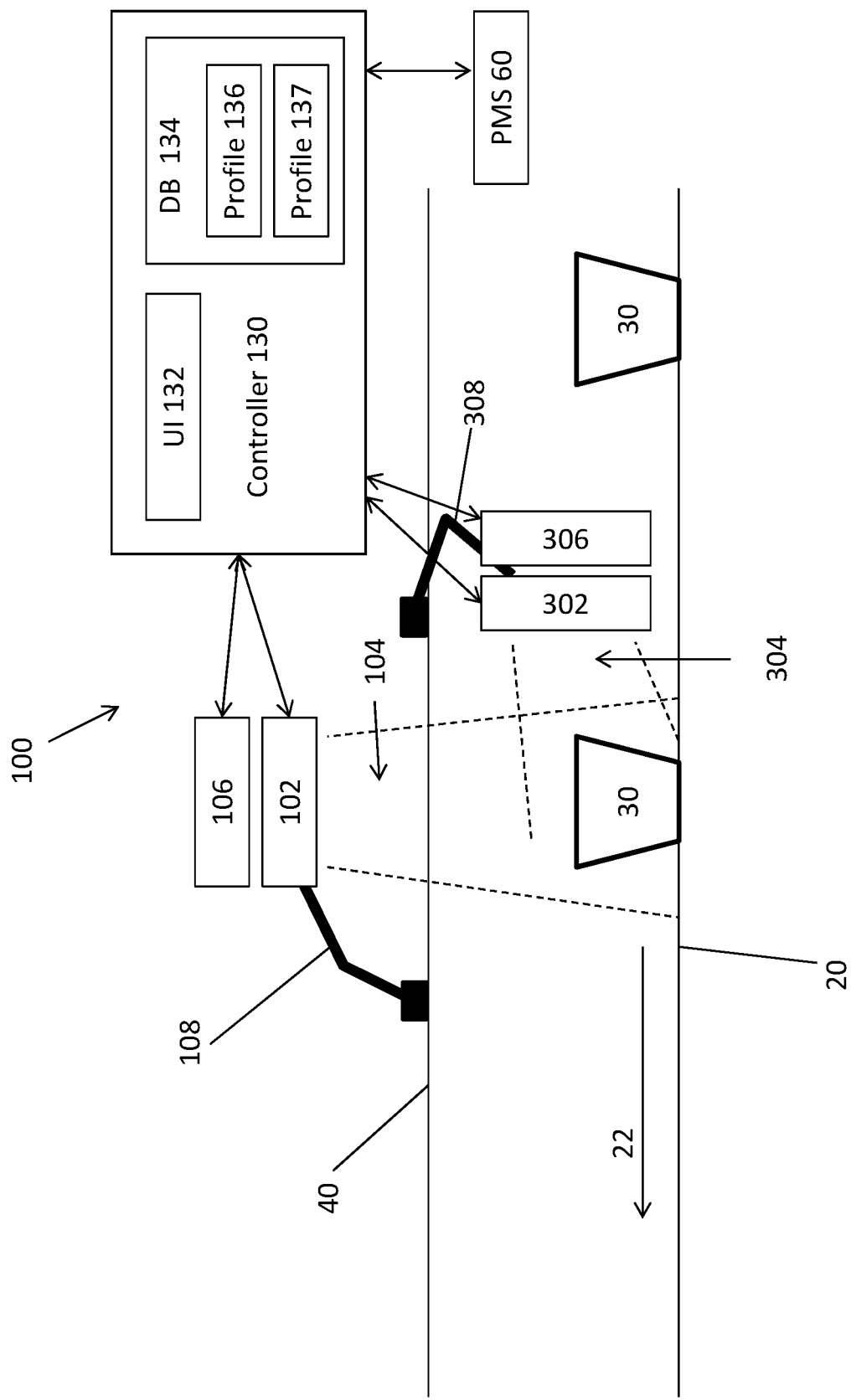
FIGS. 3A and 3B are respectively an illustrative schematic drawing and a screenshot showing automated visual inspection of a production line using multiple cameras according to embodiments of the present disclosure.
Figure 3B:
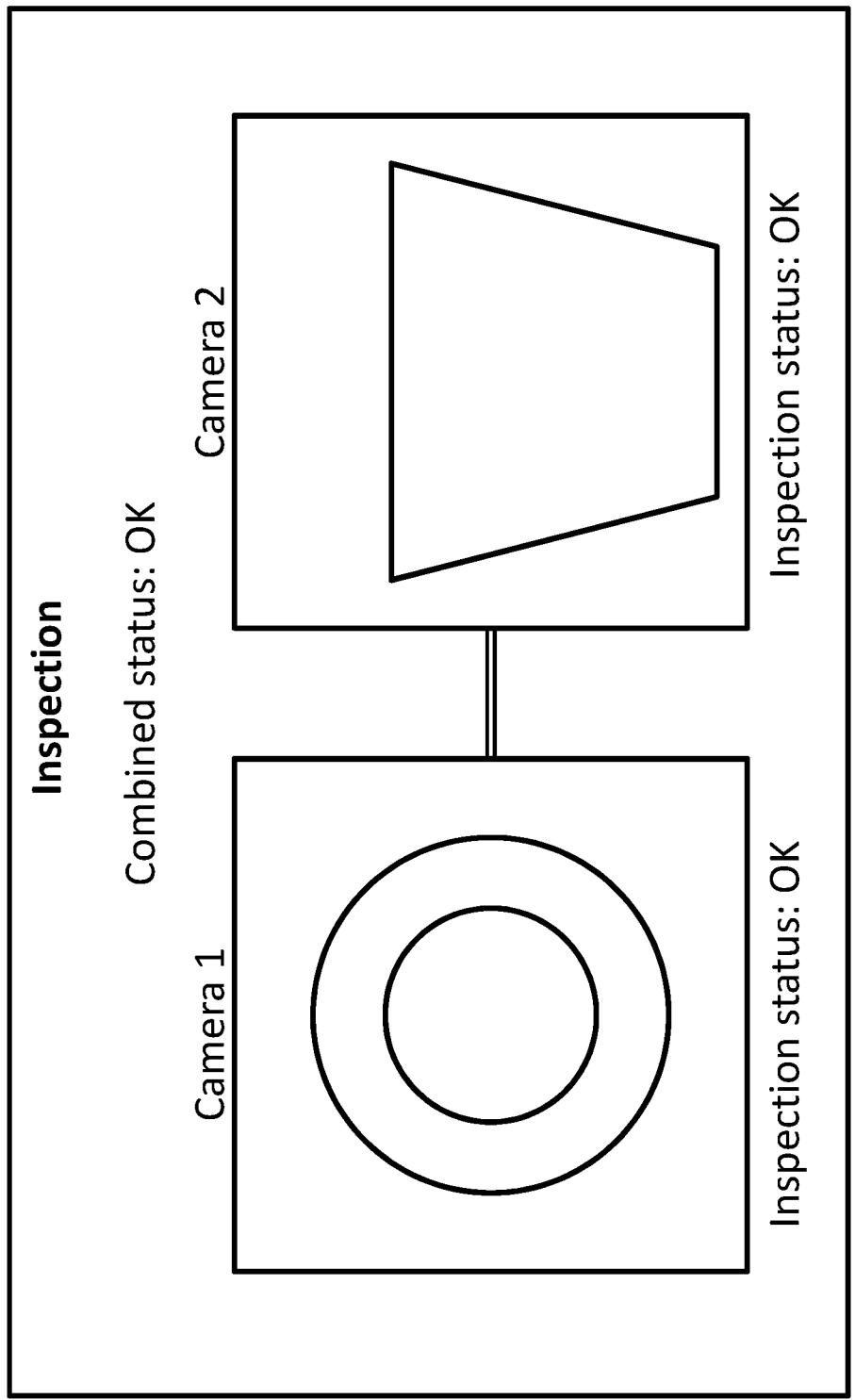

Reference is now made to FIGS. 3A and 3B which are respectively an illustrative schematic drawing and a screenshot showing automated visual inspection of a production line using multiple cameras according to at least some embodiments of the present disclosure. As shown in FIG. 3A, an automated visual inspection system 100 is provided as described above with reference to FIGS. 1A-1B. System 100 here comprises controller 130, cameras 102, 302, light sources 106, 306, and mounts 108, 308. System 100 is preferably provided as an integrated appliance for use in a manufacturing environment.

In the embodiment of FIG. 3A system 100 comprises a second camera 302 with an associated second light source 306. Camera 302 captures a different FOV 304 than that captured by camera 102. Although FIG. 3A shows two cameras used by system 100, it should be appreciated that more than two cameras can be used and the description below should not be considered limiting. It should be understood that every camera may be provided with a light source. In other embodiments a plurality of cameras may use a single light source.

In some embodiments the images captured by multiple cameras of system 100 are linked such that a defect-free set-up result is dependent on each view showing an item that is defect-free. Alternatively, each of cameras 102 and 302 image a separate item 30 to thereby increase production throughput by inspecting more than one item at a time. FIG. 3B shows a non-limiting screenshot of GUI 132 showing inspection of an item using two cameras where the combined inspection status shows no defects. Further, images may be correlated such as in the following non-limiting example: a first camera (e.g., 102) captures a top view of item 30 for inspection; a second camera (e.g., 302) captures a side view of item 30 for inspection, and a third camera (not shown) captures a view of an identifying label or code on item 30 such that a defect detected based on the image from any of the first or second cameras can be linked to the specific item as identified by the identifying label captured by the third camera.

Cameras 102 and 302 are positioned using mounts 108 and 308 such that items 30 to be inspected are within the field of view (FOV) 104 and 304 of camera 102 and 302. As above, light source 106 is attached to camera 102 or mount 108 such that light source 106 illuminates items 30 for inspection. Similarly, light source 306 is attached to camera 302 or mount 308 such that light source 306 illuminates items 30 for inspection. Where reference is made to FOV 304 herein it is to be understood that light source 306 is positioned or controlled to illuminate FOV 304.

Mounts 108 and 308 may be attached to a single mounting surface 40 or to different mounting surfaces. Surface 40 and/or another mounting surface may remain in a fixed position relative to items 30 or alternatively may move so as to repeatedly bring cameras 102 and/or 302 into a position where items 30 to be inspected are within the field of view 104, 304 of cameras 102, 302. A non-limiting example of a moving surface 40 is a robot arm or a moving conveyor on the production line.

Items 30 to be inspected may be placed on an inspection line 20 which comprises a means for supporting and moving items 30 as described above with reference to FIG. 1A.

Cameras 102 and 302 and light sources 106 and 306 may be in communication with a controller 130 as described above with reference to FIGS. 1A and 1B.

To prepare for production line inspection, system 100 requires a setup stage for each product or stage of an item that is to be inspected. In the setup stage, at least two or more defect free samples of a manufactured item 30 of the same type are placed in succession within field of views 104 and 304 of cameras 102 and 302. Each defect free sample of item 30 is imaged by both of cameras 102 and 302. These images, which may be referred to as setup images, are obtained as described above. The setup images are analyzed by controller 130 as described above, preferably based on data from all of the cameras available (in this example cameras 102 and 302). Optionally, setup analysis is based on only a portion of the available cameras such as where the FOV from a specific camera does not cover an area of expected defects (e.g., an IA).

Once it is determined, based on the analysis of the setup images, that enough information about item 30 has been obtained, the setup stage is concluded. Following the completion of the setup stage, profile 136 which describes item 30 and the setup of system 100 for inspecting item 30 and includes data from both of cameras 102 and 302 is stored in database 134. Profile 136 preferably comprises parameters and characteristics as defined above with reference to FIG. 1C for all the points of view from the cameras that have been used in the setup.

The selected profile will be used as a basis for inspection of the related manufactured item to determine if defects are present in that manufactured item. In the inspection stage that follows, items which are of the same category as the (defect-free) sample items and which may or may not have defects, are imaged, possibly concurrently, by cameras 102 and 302. The images, which may be referred to as inspection images, are processed by controller 130 using a defect detection algorithm (e.g., by using machine learning/AI algorithms) to detect defects in items 30 based on profile 136 of item 30. Notifications for defect free and defective items are preferably provided as described above with reference to FIG. 1C.

Figure 4A:
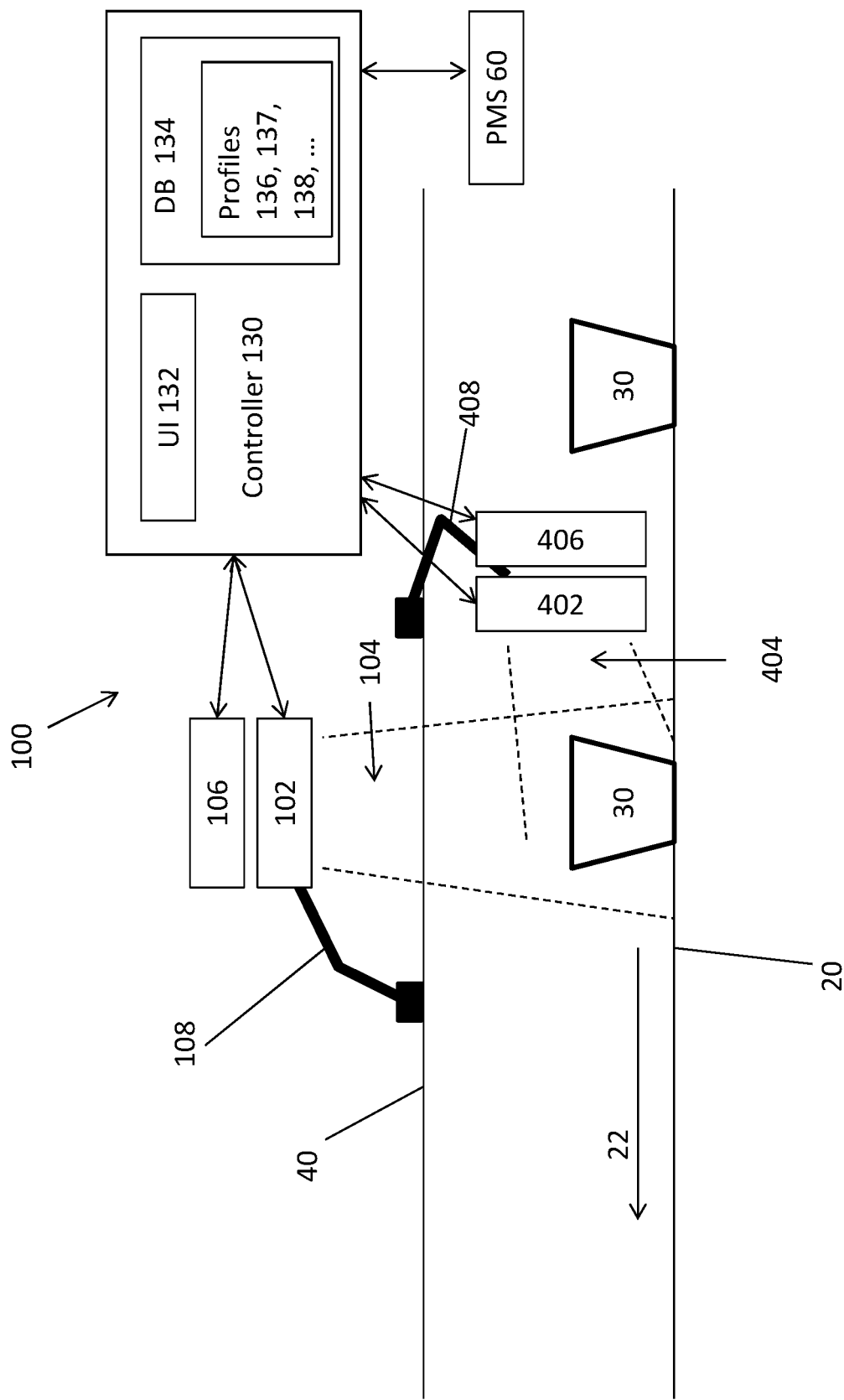
FIGS. 4A-4C and 4D are respectively illustrative schematic drawings and a flow diagram showing automated visual inspection of multiple products/product stages on a production line with multiple cameras according to embodiments of the present disclosure.
Figure 4B:
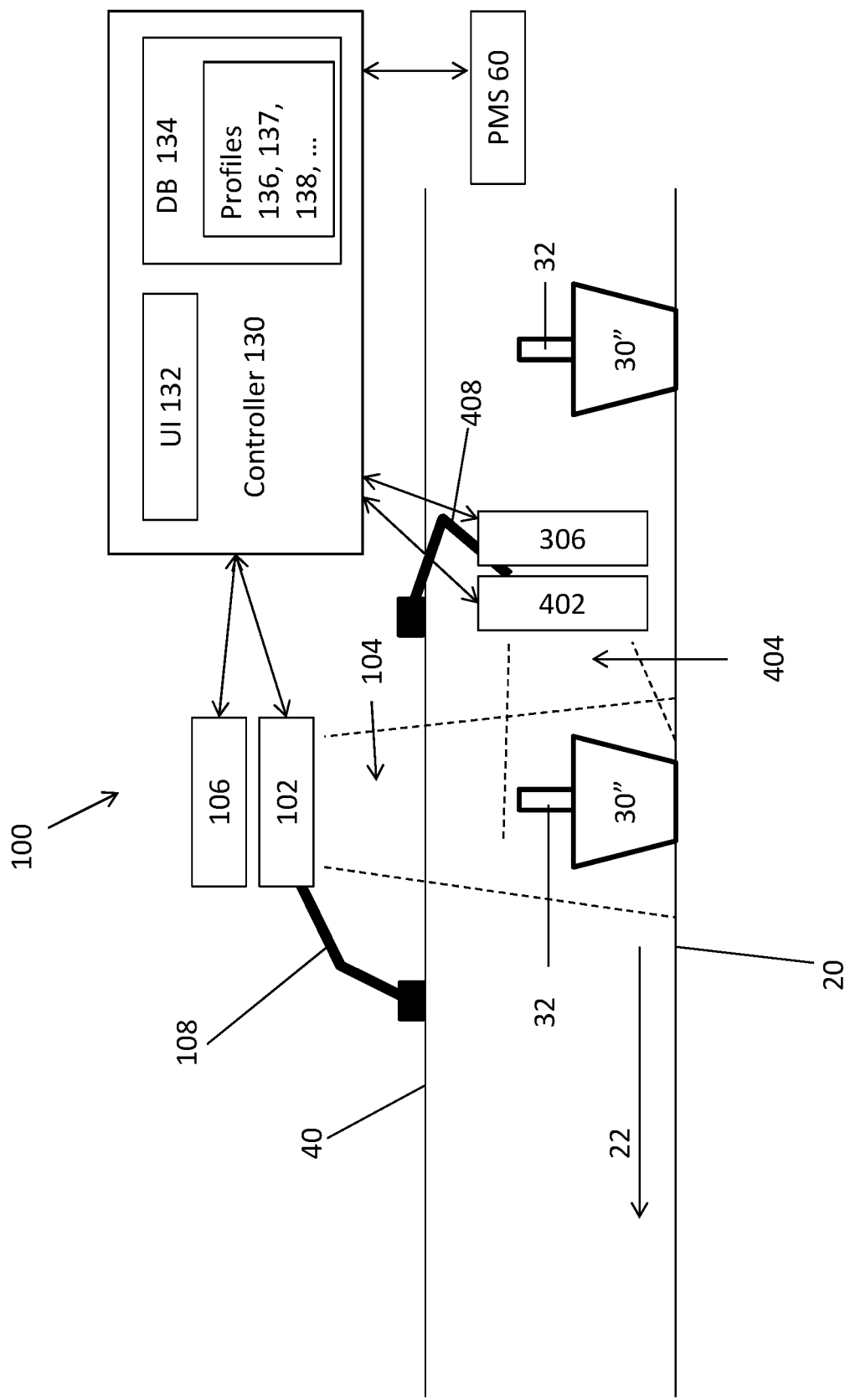
Figure 4C:
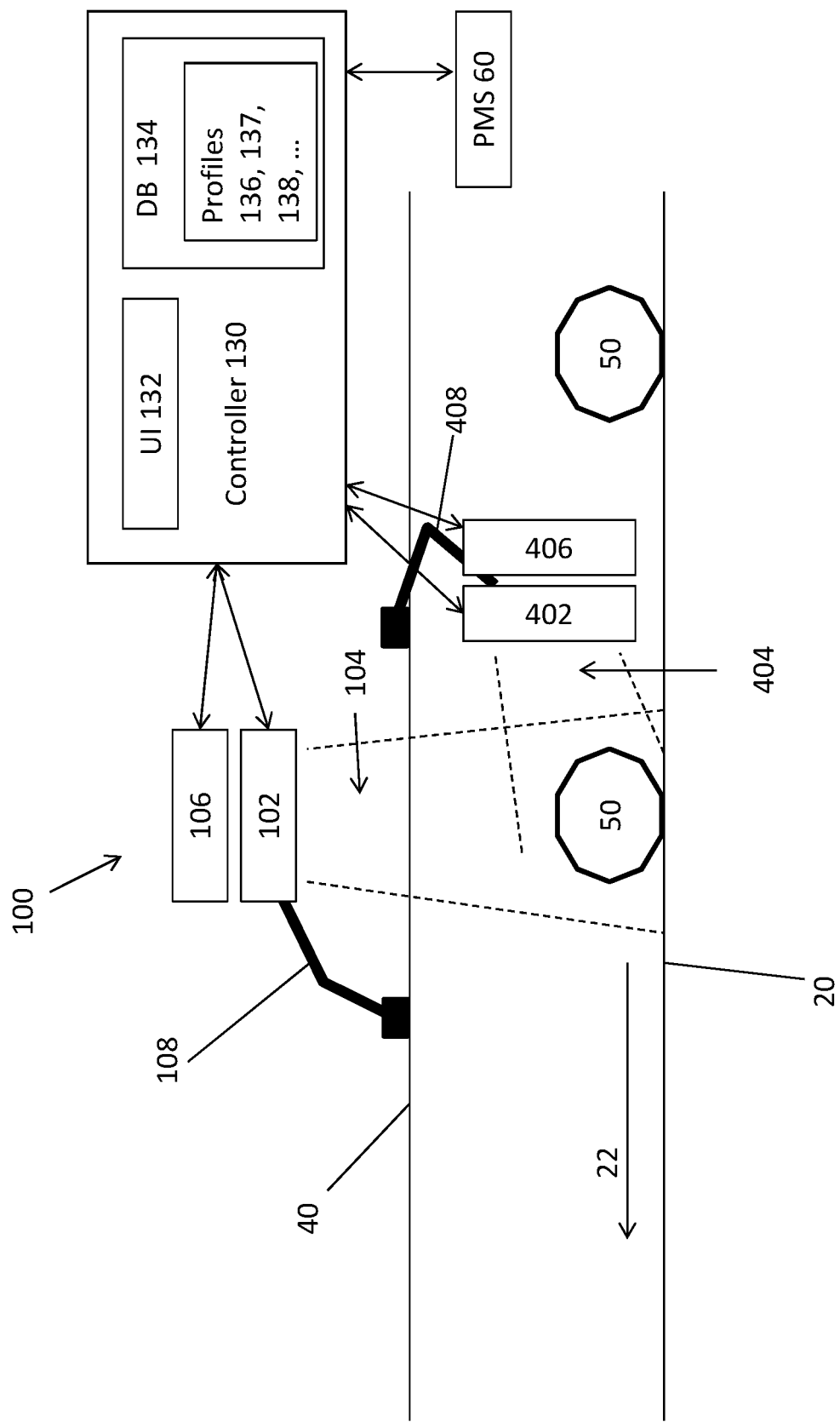

Reference is now made to FIGS. 4A-4C and 4D which are respectively illustrative schematic drawings and a flow diagram showing automated visual inspection of multiple categories (e.g., multiple products/stages on a production line with multiple cameras) according to at least some embodiments of the present disclosure. As shown in FIGS. 4A-4C, an automated visual inspection system 100 is provided as described above with reference to FIGS. 1A-1B. System 100 here comprises controller 130, cameras 102, 402, light sources 106, 406, and mounts 108, 408. System 100 may be provided as an integrated appliance for use in a manufacturing environment.

In the embodiment of FIGS. 4A-4C system 100 comprises a second camera 402 with an associated second light source 406. Camera 402 captures a different FOV 404 than that captured by camera 102.

Although two different stages of a product 30 and 30" are described herein and although two types of products 30 and 50 are described herein, it should be appreciated that system 100 can inspect any number and combination of product stages and product types and the description should not be considered limiting.

Although FIGS. 4A-4C show two cameras used by system 100, it should be appreciated that more than two cameras can be used and the description below should not be considered limiting. It should be understood that every camera is preferably provided with a light source.

In some embodiments, the images captured by multiple cameras of system 100 are linked such that a setup stage is dependent on each view showing an item that is defect-free. Further, images may be correlated such as described above with reference to FIGS. 3A and 3B.

Cameras 102, 402 are positioned using mount 108, 408 such that items 30, 30" and 50 to be inspected are within the field of view (FOV) 104, 404 of cameras 102, 402. Items 30, 30" and 50 are different stages or different products or different parts of different products manufactured on the same production line and system 100 preferably remains in the same position relative to the production line for inspection of all of stages and products 30, 30" and 50. As above, light source 106 may be attached to camera 102 or mount 108 such that light source 106 illuminates items 30, 30" and 50 for inspection. Similarly, light source 406 is attached to camera 402 or mount 408 such that light source 406 illuminates items 30, 30" and 50 for inspection.

Mounts 108, 408 are attached to a mounting surface 40. Surface 40 may remain in a fixed position relative to items 30, 30" and 50 or alternatively may move, as described above. Alternatively, cameras 102, 402 are mounted on different surfaces.

Items 30, 30" and 50 to be inspected may be placed on an inspection line 20 which comprises a means for supporting and moving items 30, 30" and 50, as described above with reference to FIG. 1A.

Cameras 102 and 402 and light sources 106 and 406 may be in communication with a controller 104 as described above with reference to FIGS. 1A and 1B.

Figure 4D:
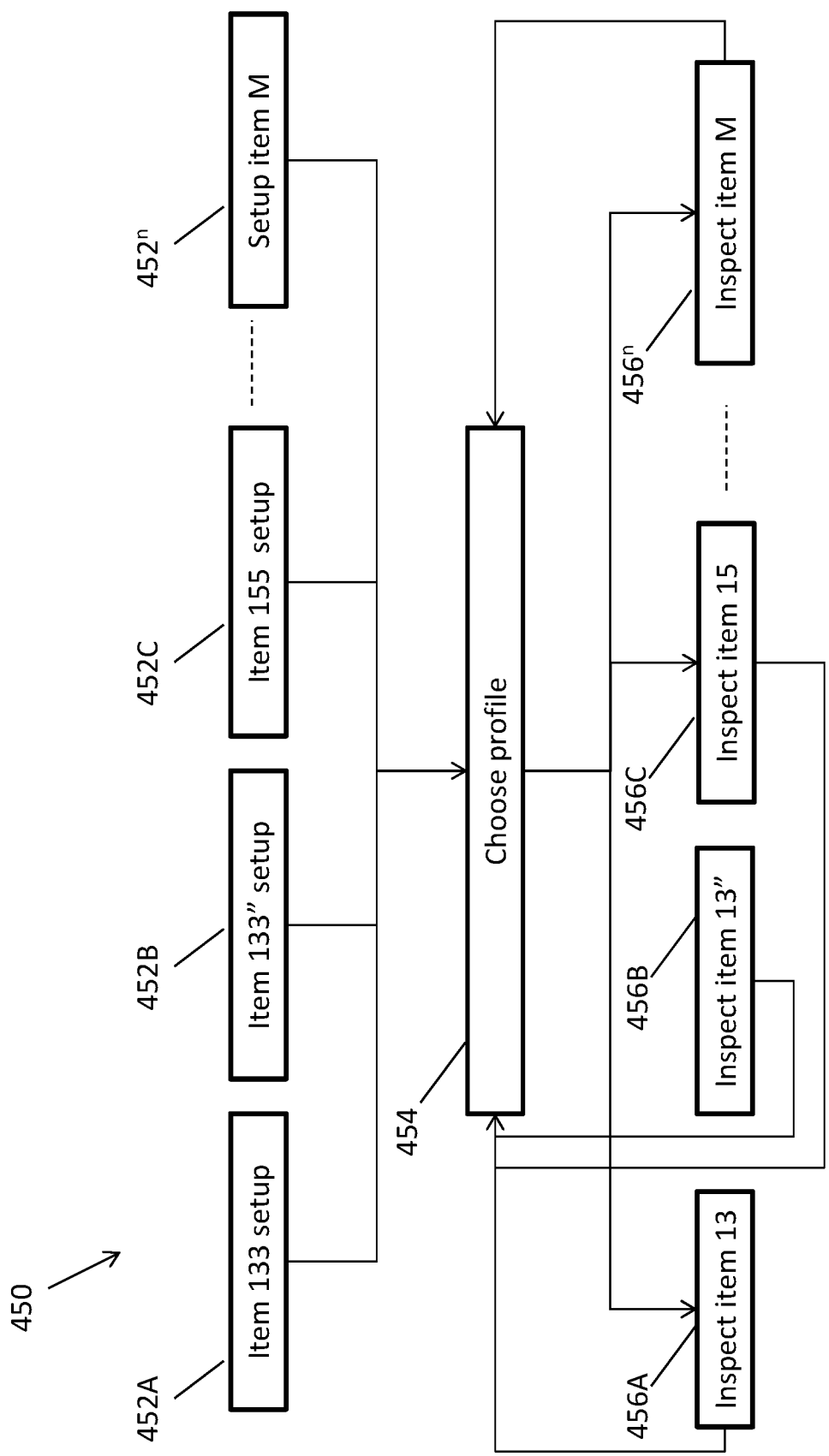

As shown in process 450 of FIG. 4D, to prepare for production line inspection, system 100 requires a setup step for each product or stage of an item that is to be inspected. In the setup step 452A, at least two or more defect free samples of a manufactured item 133 of the same category are placed in succession within field of view 104, 404 of cameras 102, 402. Each defect free sample of item 133 is imaged by cameras 102, 402. These images, which may be referred to as setup images, are obtained as described above. The setup images are analyzed by controller 130 as described above and used in the creation of a profile 136 (described further above with reference to FIGS. 1A-1F) and used for defect detection. The setup analysis is preferably based on data from all of the cameras available (in this example cameras 102 and 402). Optionally setup analysis is based on only a portion of the available cameras such as where the FOV from a specific camera does not cover an area of expected defects (e.g., an IA).

Following the completion of setup step 452A, profile 136 which describes item 133 and the setup of system 100 for inspecting item 133 is stored in database 134. Profile 136 preferably comprises parameters and characteristics as defined above with reference to FIG. 1C.

In step 452B, a similar setup process is followed for item 133" which is another stage of item 133 manufactured on the same production line as item 133. Following the setup stage for item 133", profile 137 describing item 133" is stored in database 134.

In step 452C, a similar setup process is followed for item 155 which is another product or part manufactured on the same production line as item 133. Following the setup step for item 155, profile 138 describing item 155 is stored in database 134.

Step 452n represents the nth setup process for the Mth manufactured item on the same production line (either a different product or product stage) which results in another profile stored in database 134. It should therefore be appreciated that any number of products/items may be setup with a corresponding number of profiles stored in database 134 and the example presented herein should not be considered limiting.

In step 454, as preparation for the inspection stages, the profile (136, 137, etc.) corresponding to the stage to be inspected, is selected. The selection of the profile is performed in one or more of the ways described above with reference to FIG. 1C.

The selected profile will be loaded by controller 130 and used as a basis for inspection of the related manufactured item to determine if defects are present in that manufactured item.

In the inspection step 456A that follow the profile selection (136) of item 133, items 13 which are of the same category as the (defect free) sample items and which may or may not have defects, are imaged concurrently by cameras 102, 402. The images, which may be referred to as inspection images, are processed by controller 130 using a defect detection algorithm (e.g., by using machine learning/AI algorithms) to detect defects in the items. In step 456A item 13 is inspected based on profile 136.

Similarly, such as at steps 456B-456n, other items such as 13", 15 to M are inspected for defects. GUI 132 preferably notifies a user regarding inspected items found to have a defect. Optionally different alerts may be provided for defects detected on different parts or stages, or seen by different cameras for inspected items. Optionally items that are defective are marked in some way or removed from the production line. Optionally, PMS 60 is informed about defective items.

Optionally a setup step such as 452B may take place after inspection step 456A, i.e. additional profiles for additional items may be added at any time and added to the profile database 134. Inspection steps 456A-456n may also be implemented in any order depending on the needs of the manufacturing plant. Further, as above, the number or order of inspection steps 456A-456n is not limited. Notifications for defect free and defective items are preferably provided as described above with reference to FIG. 1C.

While the description above assumes that the setup stages and inspection stages take place on the same inspection line, it should be noted that an inspection file can be created, which includes setup parameters (e.g., distance of the item from the camera and/or location of the item within the field of view) and the inspection may therefore take place, using the inspection file, in a separate location with a separate inspection system, or with the same inspection system remounted in a different place and/or production line.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination.

What is claimed is:

1. A method for automated visual inspection of different category items on a production line, the method comprising:
   creating, for a first category item, an item profile which comprises data relating to a relationship between the first category item and a second category item;
   using a controller to determine a sequence of inspection of the first category item relative to the second category item, based on the item profile of the first category item;
   upon detection of the first category item in an image, applying a defect detection algorithm in accordance with the sequence of inspection; and
   outputting to a user, indications of defects for the first and second category items, based on the defect detection algorithm,
   wherein the first and second category items comprise any one of:
      different stages in a manufacture process of a single product,
      different views of a same item,
      a same view of a same item imaged with different camera assembly settings,
      different type items on a same production line, and
      different interest areas on an item.

2. The method of claim 1 wherein the sequence of inspection comprises an order of inspection of the different interest areas.

3. The method of claim 1 comprising using the controller to automatically switch between the item profile of the first category item and item profile of the second category item, based on detection of the first category item in an image.

4. The method of claim 3 further comprising using the controller to automatically switch between item profiles based on a pre programmed condition comprising one or a combination of:
   a) completion of inspection of a predetermined number of another item, and
   b) determination that an item is defect-free.

5. The method of claim 1 wherein the item profile comprises data relating to one or more of:
   images that were approved as showing a defect-free item,
   item boundaries,
   specific inspection areas,
   optimal camera parameters for imaging the defect-free item,
   compositional properties of the defect-free item,
   indication of parts the defect-free item that move independently of other parts,
   typical image data values for the defect-free item for different camera parameters,
   typical image data values for the item for different light source parameters,
   optimal lighting parameters, and
   properties for optimal detection of alignment of the item.

6. The method of claim 1 wherein the item profile comprises instructions and information for the user.

7. The method of claim 1 wherein the item profile comprises an action to be taken based on detection of the first category item in the image.

8. The method of claim 1 wherein the item profile comprises an action to be taken upon detection of a defect on the first category item or second category item.

9. The method of claim 1 wherein outputting indications of defects comprises displaying a defect status that includes a combined status of the first category item and second category item.

10. An appliance for automated visual inspection of at least two items from different categories, the appliance comprising:
   at least one camera to obtain images of an item from a first category and an item from a second category; and
   a controller, in communication with the camera, the controller adapted to
      determine a sequence of inspection of the first category item relative to the second category item, based on an item profile of the first category, and
      upon detection of the first category item in an image, apply a defect detection algorithm in accordance with the sequence of inspection,
   wherein the first and second category items comprise any one of:
      different stages in a manufacture process of a single product,
      different views of a same item,
      a same view of a same item imaged with different camera assembly settings,
      different type items on a same production line, and
      different interest areas on an item.

11. The appliance of claim 10 wherein the controller automatically switches between the item profile of the first category item and an item profile of the second category item, based on detection of the first category item in an image.

12. The appliance of claim 10 wherein the camera comprises at least one of a polarizing lens, tele-centric lens, narrow band lens placed over a lens of the camera or directly upon the camera imaging chip.

13. The appliance of claim 10 wherein the controller is adapted to control an intensity or color of a light source, or both.

14. The appliance of claim 10 wherein the item profile comprises optimal lighting parameters of the light source.

15. The appliance of claim 10 wherein the item profile comprises optimal parameters of the camera.

16. The appliance of claim 10 adapted to be attached to an adjustable mount and wherein the item profile comprises positioning data for the mount.

17. The appliance of claim 10 wherein the controller is adapted to select the item profile based on one of:
- selection by an operator,
- selection by an external system,
- selection following completion of a predetermined number of another item, and
- item detection using an image analysis algorithm.

18. The appliance of claim 10 wherein the controller is adapted to:
- determine a product's defect status based on defects detected on items comprising the product, and
- output an indication of the product's defect status.

\* \* \* \* \*